United States Patent [19]

Isono et al.

[11] 4,034,341
[45] July 5, 1977

[54] AUTOMATIC POSTAL-CODE-NUMBER READING SYSTEM

[75] Inventors: Tomoyuki Isono; Toshio Nakada, both of Tokyo, Japan

[73] Assignee: Nippon Electric Company, Ltd., Tokyo, Japan

[22] Filed: Apr. 22, 1976

[21] Appl. No.: 679,405

Related U.S. Application Data

[63] Continuation-in-part of Ser. No. 533,559, Dec. 17, 1974, abandoned.

[30] Foreign Application Priority Data

Dec. 17, 1973 Japan .............................. 48-142240

[52] U.S. Cl. .................... 340/146.3 H; 209/DIG. 1; 235/61.11 E
[51] Int. Cl.² ......................................... G06K 9/04
[58] Field of Search ............................. 209/DIG. 1; 235/61.11 E; 340/146.3 H, 146.3 R, 146.3, MA, 146.3 D

[56] References Cited

UNITED STATES PATENTS

| | | | |
|---|---|---|---|
| 3,223,973 | 12/1965 | Chatten | 340/146.3 H |
| 3,295,105 | 12/1966 | Gray et al. | 340/146.3 H |
| 3,432,032 | 3/1969 | Curphey et al. | 340/146.3 R |
| 3,432,673 | 3/1969 | Mader | 340/146.3 D |
| 3,644,890 | 2/1972 | Matthews | 340/146.3 H |
| 3,818,445 | 6/1974 | Neville | 340/146.3 H |
| 3,846,753 | 11/1974 | Spanjersberg | 340/146.3 H |

*Primary Examiner*—Leo H. Boudreau
*Attorney, Agent, or Firm*—Sughrue, Rothwell, Mion, Zinn and Macpeak

[57] ABSTRACT

A postal code detection system is described having a prescanning apparatus operable to detect the position on a mail item of a postal code. The pre-scanning apparatus detects word length, character height of each word, and word position. Based on the latter detected information and on a set of predetermined rules of postal code placement, the postal code can be identified to the exclusion of all other words on the mail item, and its position can be identified and sent to the main scanner and recognition circuitry.

7 Claims, 38 Drawing Figures

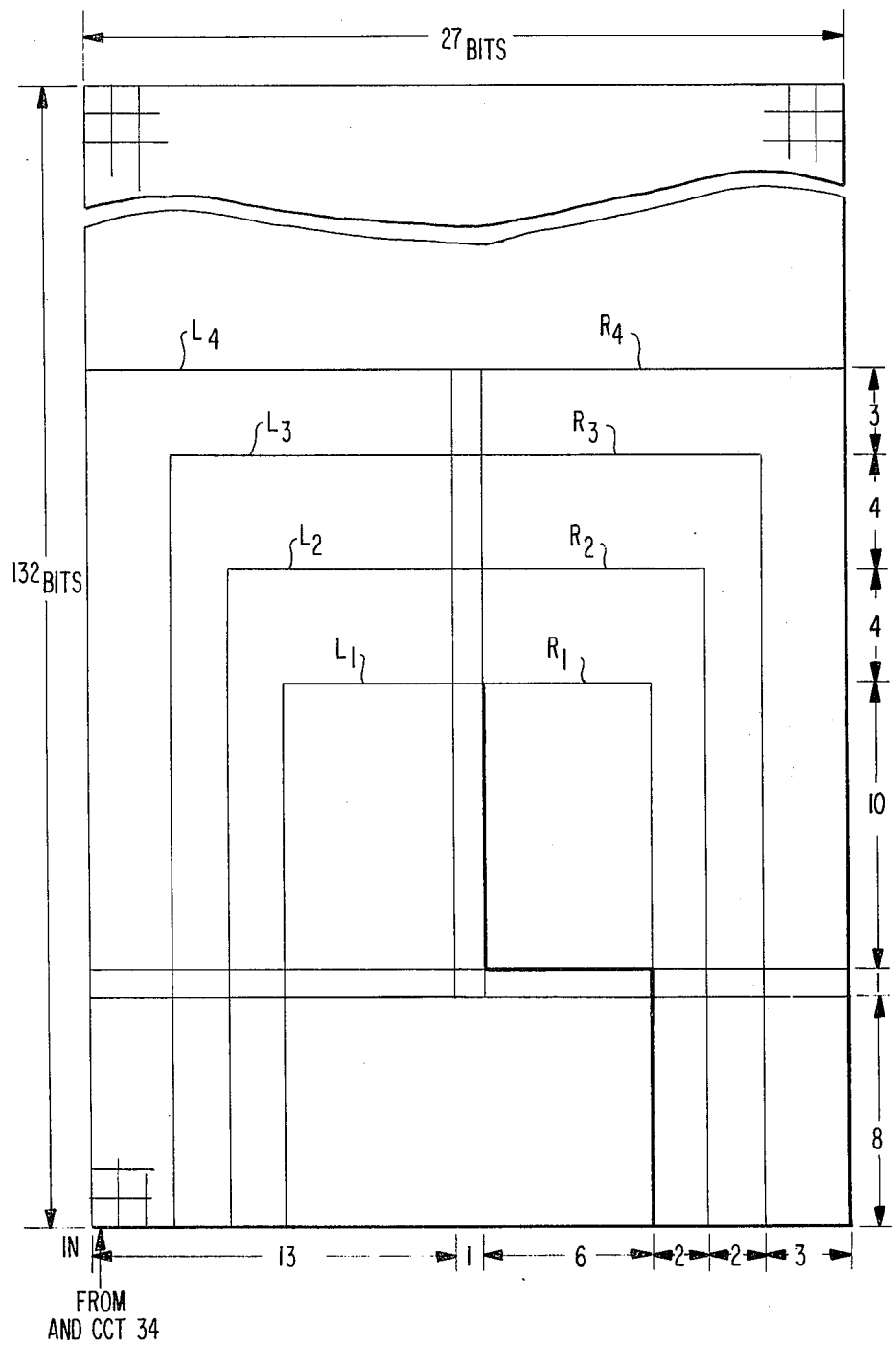

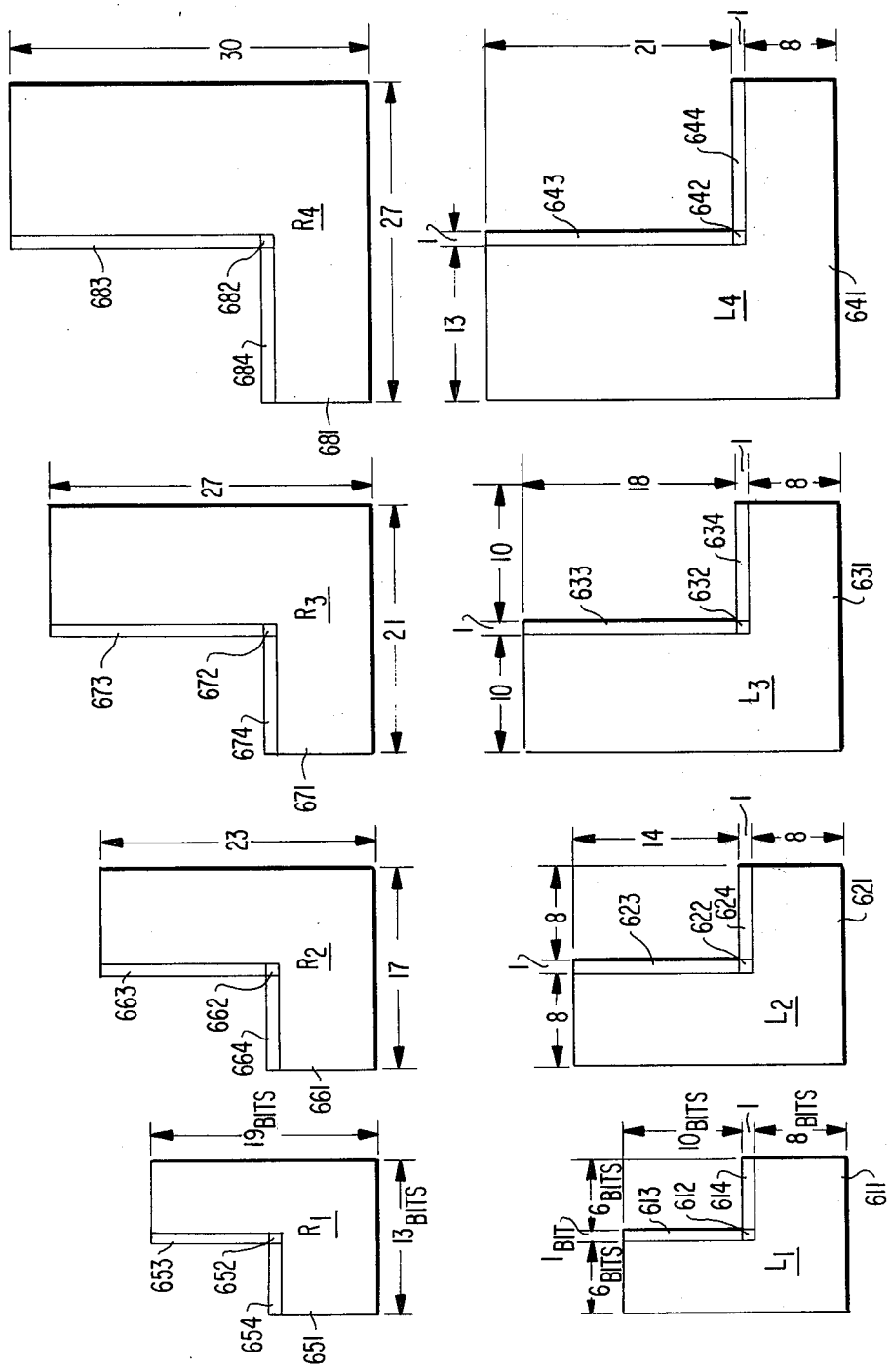

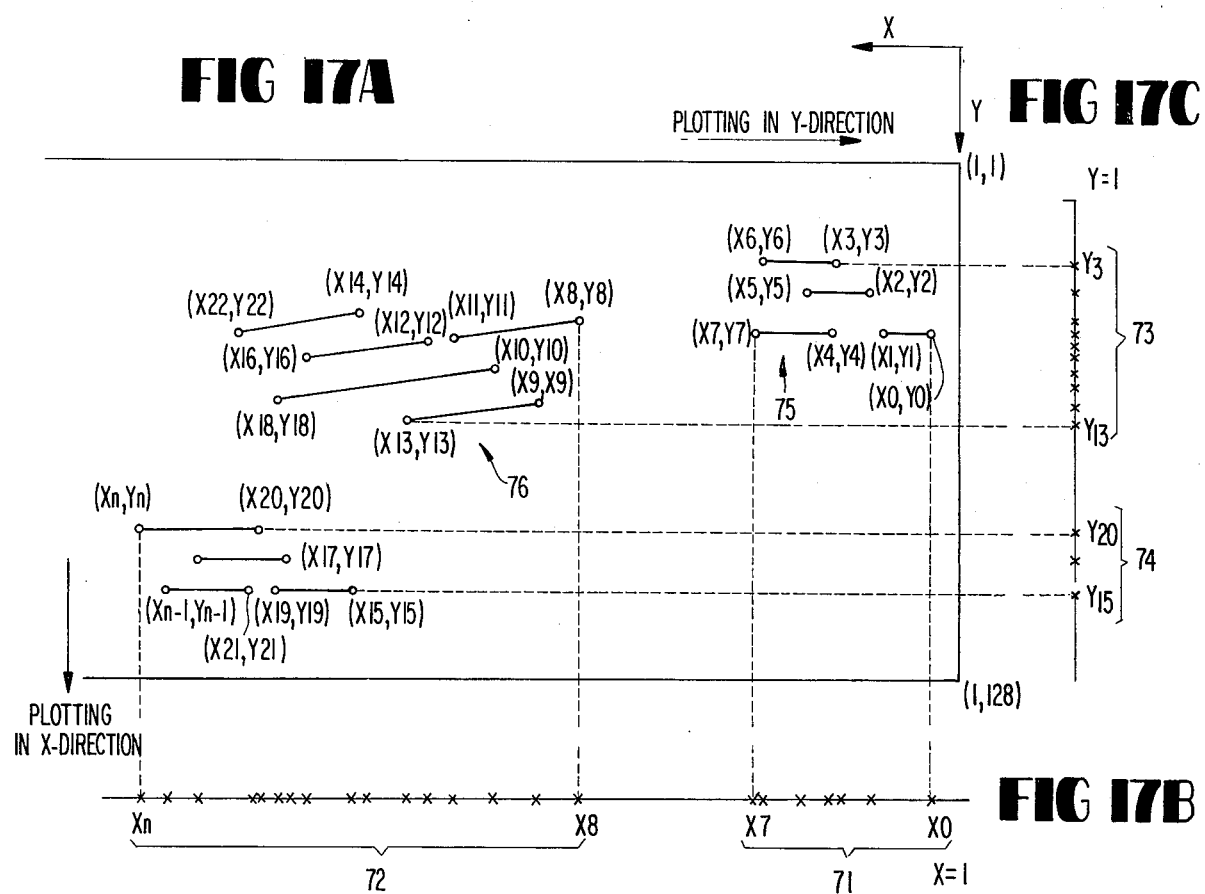
FIG 17A  FIG 17C
FIG 17B
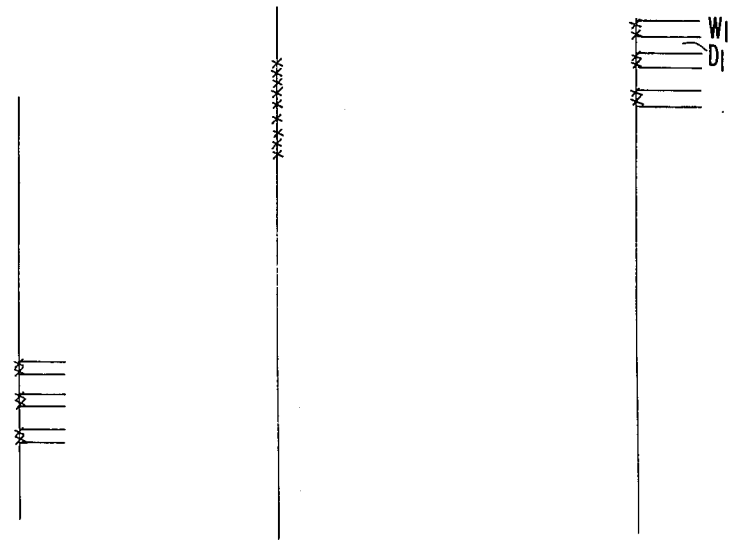
FIG 18A  FIG 18B  FIG 18C

FIG 25 (SUB-GROUPING CIRCUIT 3881)

FIG 31A
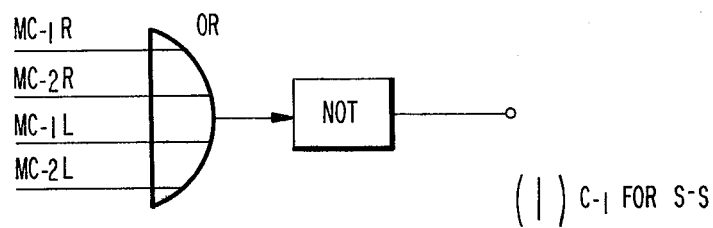
(1) C-1 FOR S-S
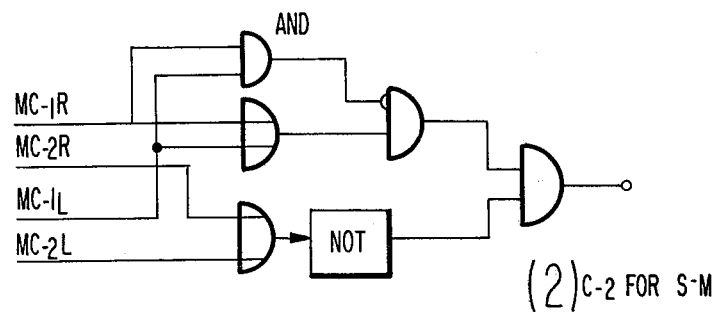
(2) C-2 FOR S-M
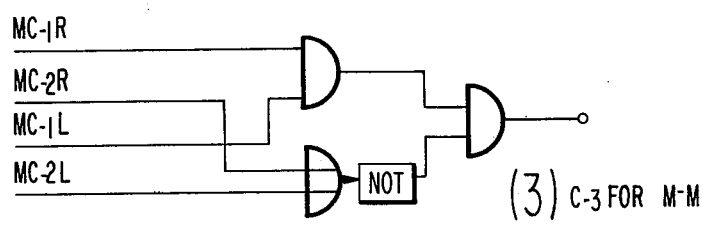
(3) C-3 FOR M-M
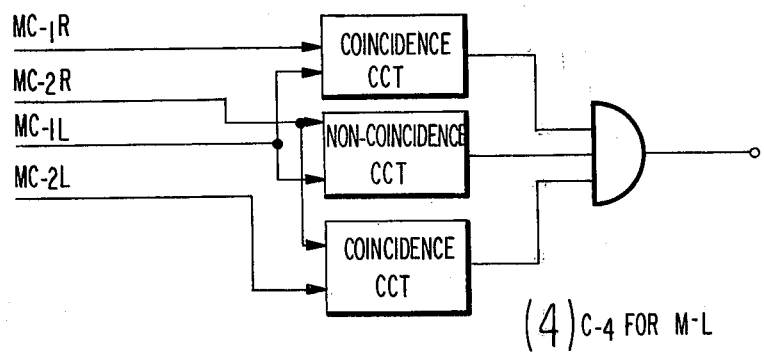
(4) C-4 FOR M-L

FIG 31 B
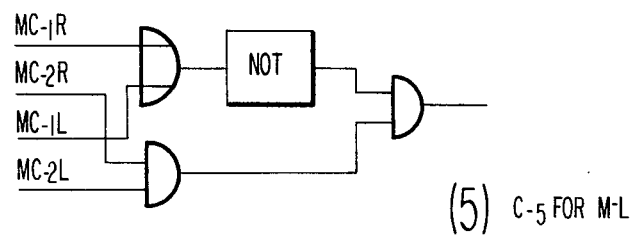
(5) C-5 FOR M-L
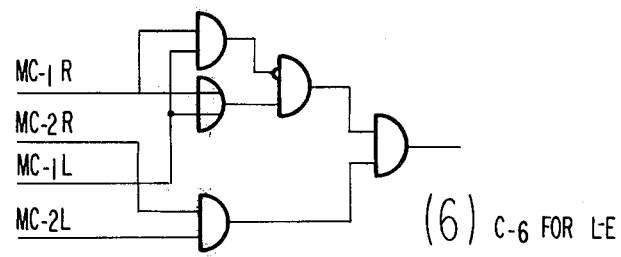
(6) C-6 FOR L-E
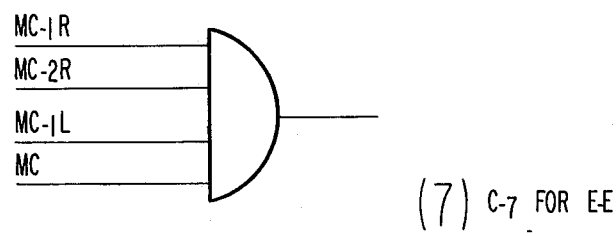
(7) C-7 FOR E-E

AUTOMATIC POSTAL-CODE-NUMBER READING SYSTEM

RELATED APPLICATION

The instant application is a continuation-in-part application of the U.S. application of Isono et al., Ser. No. 533,559, filed Dec. 17, 1974, now abandoned.

BACKGROUND OF THE INVENTION

This invention relates to an automatic postal-code-number reading system wherein a postal code number on a mail item such as postcards and envelopes is automatically detected and read out.

In order to sort mail by an automatic mail handling system, a postal code number system has been adopted. The postal code numbers are written along with the address on the mail items. As stated in an article titled "Recognition of the Postal Code Number" published in the Nippon Electric Technical Journal, No. 94 August 1969, pp 30–38, the position of the postal code numbers on the mail items should be strictly determined. This may be accomplished, for example, by printing in advance on the mail items entry frames to enter the postal code numbers therein. In the case of bulk mail items such as advertizing mail, a rectangular space for the postal code numbers is strictly determined. Such rectangular space is, for example, 15 mm high and 40 mm wide, with its left lower corner being 40 mm apart from both the left edge and the bottom.

To sort such mail items, various kinds of automatic postal-code-number reading systems have been proposed. One of them is described in an article titled "Automatic OCR-Sorter" published on pages 39–46 of the aforementioned publication. In this conventional system, only the predetermined area (such as the entry frames) on a mail item is scanned by scanning means such as a flying-spot scanner.

These conventional automatic postal-code-number reading systems are practicle only to sort mail which has strictly preassigned area for the postal code number. Recently, however, a need has arisen for adaptation to more flexibly preassigned areas for postal code on mail items, particularly bulk mail items.

In the conventional automatic postal-code-number reading system adapted to handle such mail items, the entire area for the postal code must be scanned by the scanning means, and the scanning output must be stored in storing means to recognize the postal code. As a result, a large capacity is needed for the storing means. This tends to slow down the handling speed.

SUMMARY OF THE INVENTION

It is, therefore, an object of this invention to provide an improved automatic postal-code-number reading system capable of handling those mail items which may have relatively broad preassigned areas for postal code.

According to this invention, there is provided an improved automatic postal-code-number reading system, in which the area occupied by the postal code number is first detected by coarse scanning of the postal item, and then the detected area is finally scanned to recognize the postal code number. The pre-scanning apparatus operates to detect the position of the postal code and feed the position information to the postal code recognition circuitry. This enables the conventional recognition circuitry to scan a smaller than usual area saving time and capacity.

BRIEF DESCRIPTION OF THE DRAWINGS

FIG. 5 shows the relationship between the data bits stored in the pattern shift register of FIG. 3 and the word end masks of FIG. 6;

FIG. 6 shows the various word end masks employed in the embodiment of FIG. 3;

FIGS. 17A, 17B and 17C and FIGS. 18A, 18B and 18C are graphs helpful in understanding the mode of operation of the positioning determination circuit;

FIGS. 31A and 31B are block diagrams of detectors which form parts of FIG. 30.

DETAILED DESCRIPTION OF PREFERRED EMBODIMENTS

Figure 1:
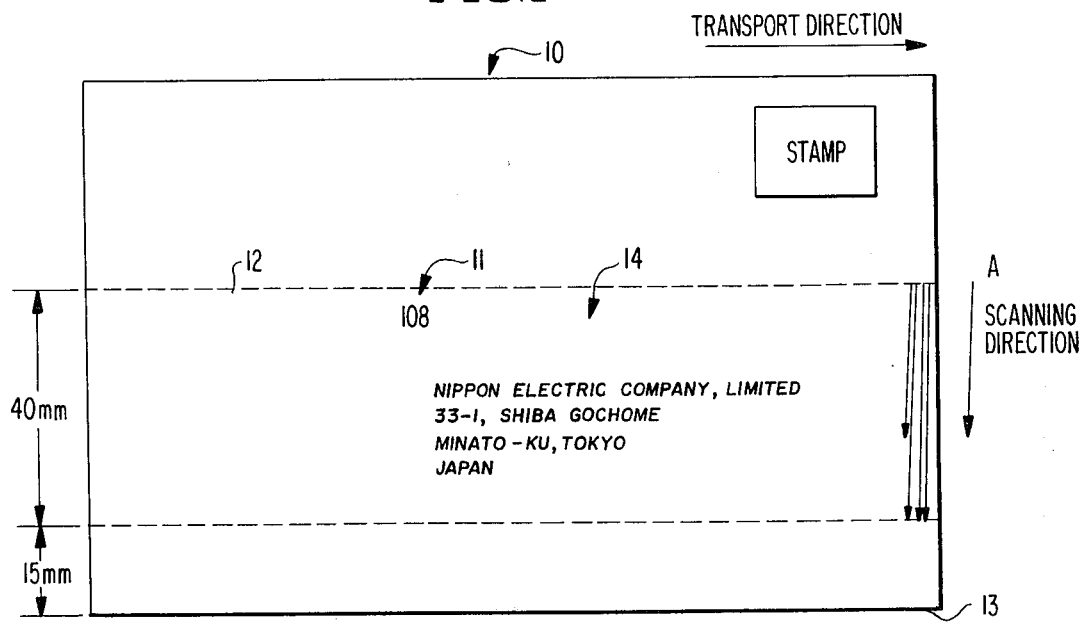
FIG. 1 shows an example of a mail item having a flexibly preassigned area for a postal code.

Referring to FIG. 1, there is shown a typical bulk mail item 10. Position 11 for a postal code e.g., 108, may be anywhere within a relatively broad 40 mm wide area 12, the bottom of the area 12 lying 15 mm above and parallel to the lower edge 13 of the mail item 10. Further, the code should be positioned above or in line with the uppermost line of the address within the area 14. In the case where the code is placed above the uppermost line, it should also protrude leftward from the left-hand side of the addressing area 14.

Figure 2:
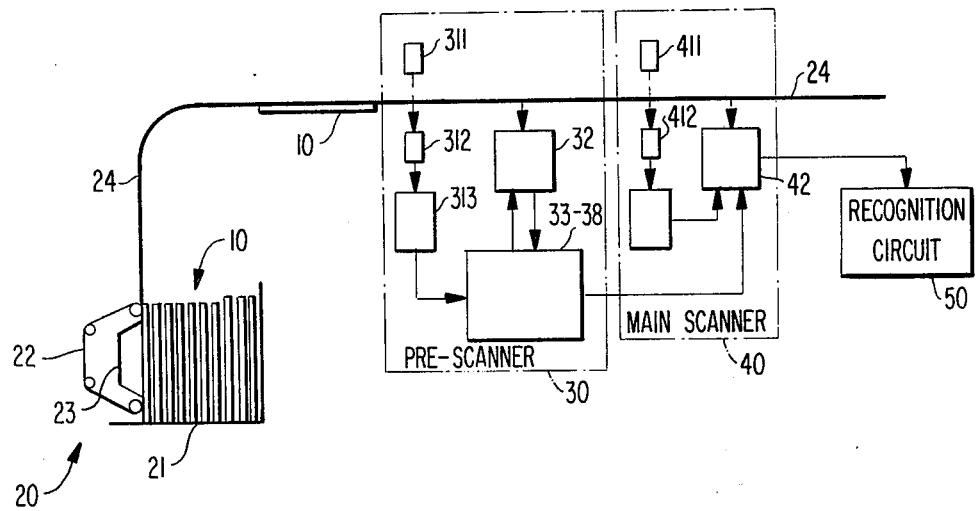
FIG. 2 is a block diagram of a mail sorting system having a pre-scanner positioned in advance of the main scanner and recognition circuitry.

Referring to FIG. 2, an embodiment of this invention for handling the mail item 10 shown in FIG. 1, comprises a feeder section 20, a pre-scanning section 30, a main scanning section 40, and a recognition circuit 50. All of the latter parts of a sorting and recognition system except for the pre-scanner 30, are well known in the art and, therefore, will be described only superficially herein.

The feeder section 20 comprises a hopper 21, an endless conveyor belt 22, and a suction chamber 23. The conveyor belt 22 has several pairs of suction apertures formed at regular intervals longitudinally. The suction chamber 23 is connected through a pipe to a suction pump (not shown). The wall of the suction chamber 23 which is kept in contact with the conveyor belt 22, is provided with suction apertures (not shown) having substantially the same diameter as those of the conveyor belt 22. The mail items 10 contained in the hopper 21 are fed one by one by the conveyor belt 22 through a transport path 24 to the pre-scanning section 30 at a speed of 3m/sec. The area 12 is coarsely scanned while the mail item 10 is passing through the pre-scanning section 30.

At the pre-scanning section 30, to be described in greater detail hereafter, the area 12 is scanned in a raster pattern, and the X and Y coordinate positions of the leading end and rear end of the postal code are determined and delivered to the main scanning unit 40. The latter unit scans the smaller area where the postal code is located, as designated by the pre-scanner, with a fine scan. The video data resulting therefrom is applied to a character recognition circuit of a type well known in the art. As shown in FIG. 2, the position signals X and Y of the postal code number are supplied to a flying spot scanner 42 of the main scanner, whereby the scanning area is controlled by controlling the deflections of both directions. Thus, the flying spot scanner 42 scans the area of the detected postal code number 11 upon receipt of a signal which is obtained from a light coupler 41 (compound of a lamp 411 and a photodetector 412) and is delayed by a delay circuit 413. The output signal from the flying spot scanner 42 is transmitted to a character recognition circuit 50 in which the postal code is recognized. Then, the result is supplied to the mail sorting system.

Figure 3:
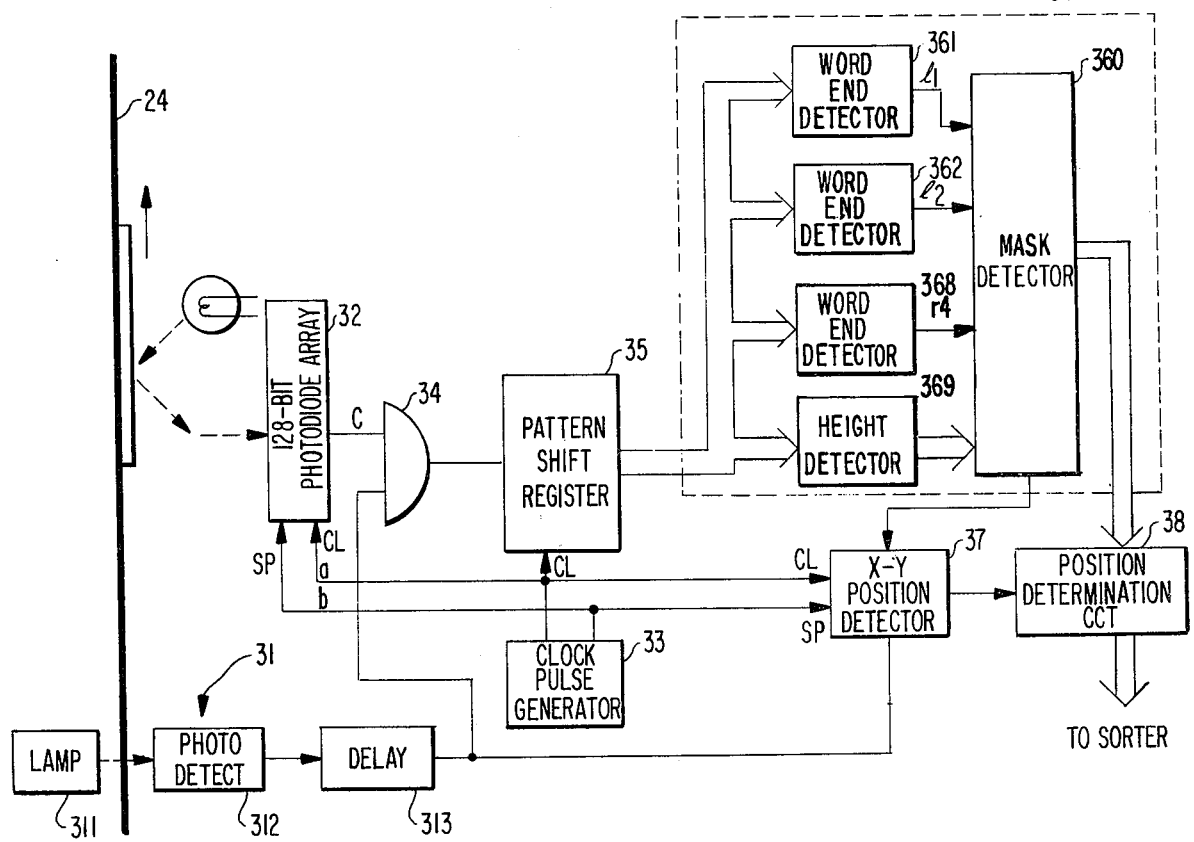
FIG. 3 is a block diagram of a pre-scanner of the embodiment of FIG, 2.
Figure 4A:
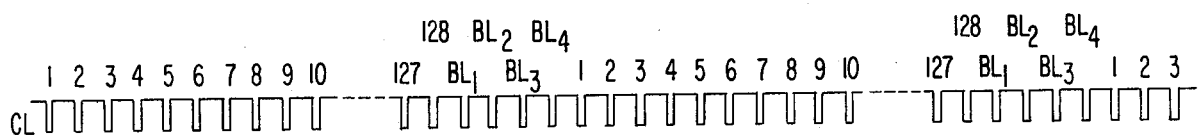
FIGS. 4($a$), 4($b$) and 4($c$) the waveforms of signals appearing at various parts of the apparatus of FIG. 3.
Figure 4B:
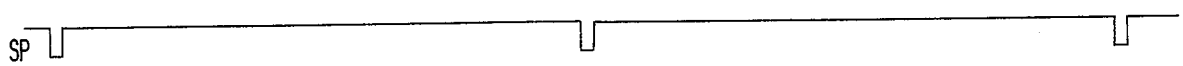

The pre-scanning section 30 comprises, as shown in FIG. 3, a light coupler 31 composed of a lamp 311 and a photodetector 312 for detecting the leading edge of the mail item 10 and a 128-bit photodiode array 32 installed downstream of the light coupler 31 in direction of transport of the mail items 10. The photodiode array 32 is supplied from a clock pulse generator 33 with a clock pulse train CL and a start pulse SP as shown in FIGS. 4(a) and 4(b), respectively. Thus the area 12 of the mail items 10 is scanned by the photodiode array 32 in the direction of arrow A shown in FIG. 1. During scanning, the 128-bit clock pulse train CL is employed for the Y-direction (vertical) scan, with four additional bits of the clock pulse train CL serving as blanking pulses. The pitch of the X-direction (horizontal) scan depends on the transport speed (3 m/sec) of the mail items 10 and the vertical scanning period. The pitch of the horizontal scanning is made equal to that of the vertical scanning, i.e., 0.312 mm (= 40 mm/128 bits). Therefore, the vertical scanning period is $$104 \text{ microseconds} \left( = \frac{0.312 \text{ mm}}{3 \text{ m/sec}} \right),$$

while the clock frequency is about $$1.27 \text{ MHz} \left( = \frac{128+4}{104 \ \mu s} \right).$$

Figure 4C:
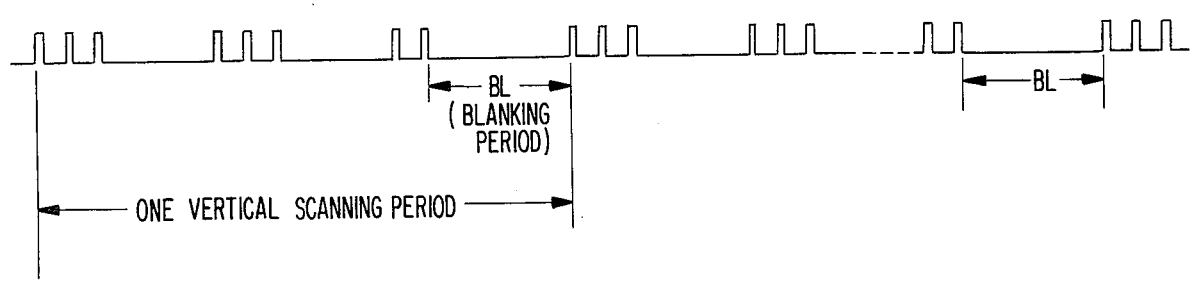

As a result, a video signal $c$ having a 4-bit blanking period as shown in FIG. 4(c) is obtained at the output of the photodiode array 32. The video signal $c$ is supplied through an AND circuit 34 to a pattern shift register 35.

On the other hand, the mail item 10 is detected by the light coupler 31 which produces a detection signal. The detection signal is applied to a delay circuit 313 having a delay time equal to the time needed for each mail item to travel from the light coupler 31 to the photodiode array 32. The delayed signal is applied to the AND circuit 34 to cause the video signal $c$ to be supplied to the pattern shift register 35 only when the area 12 of the mail items 10 is being scanned by the photodiode array 32.

The pattern shift register 35, which is as shown in matrix form FIG. 5, has 27 stages, each having 132 bits. The last bit of each stage is connected to the first bit of the following stage. The video signal or video bits supplied from the AND circuit 34 to the first bit position of the first stage is successively shifted in the shift register 35 by the clock pulses CL supplied from the clock pulse generator 33.

The shift register 35 is connected to a mask detecting means 36 for producing a mask signal representing the leading or rear end, and the relative height of a word written on the mail item 10. The data storage contents in the first thirty-two bits of each of the stages of the shift register 35 (i.e., 32 × 27 bits) are transferred to the mask detecting means 36, which comprises eight word-end detectors 361–368, a height detector 369, and a mask detector 360.

Figure 7:
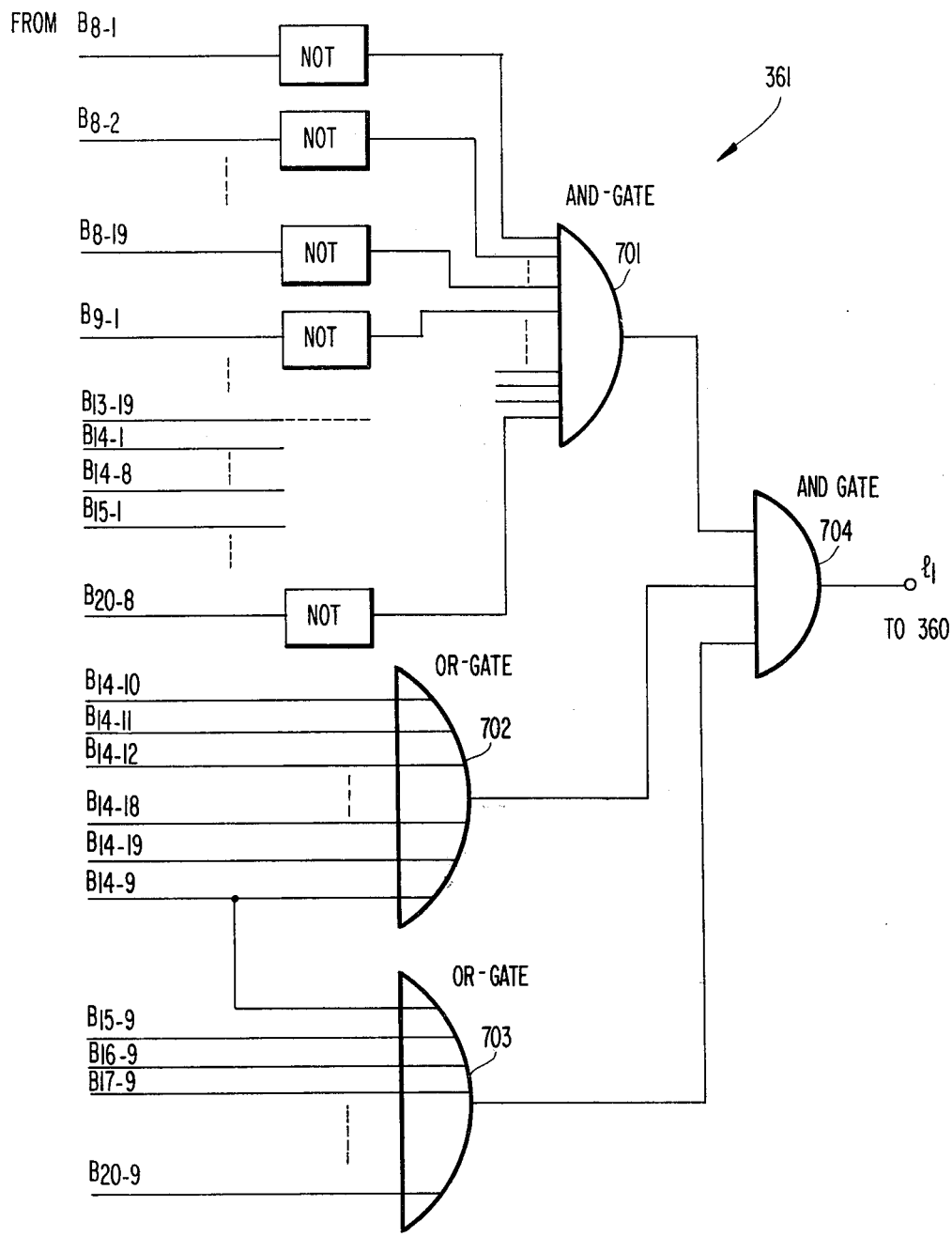
FIG. 7 is a block diagram of a word end mask detector.

Each of the word end detectors is a logic circuit having inputs from selected stages of register 35. The logic is simple and the inputs are selected so that conceptually each word end detector operates like a mask of fixed shape. For example, referring to FIG. 5, which illustrates broadly the 3,564 data bit positions (27 × 132) of register 35 in matrix format of 27 bit columns and 132 bits rows, the "shape" of the word end detectors are illustrated as L1 – L4 and R1 – R4 for detectors 361–368, respectively. The shapes are shown individually in FIG. 6. In actuality, all of the register stages within the boundaries of the L1 border are applied as inputs to the detector 361. Furthermore, the inputs are logically grouped in three different groups as seen by referring to shape L1 in FIG. 6 and the detailed logic diagram of detector 361 in FIG. 7.

The first group comprises bits applied via respective NOT gates to AND gate 701. These bits are bits 1-19 of stages (columns — see FIG. 5) eight through thirteen, and bits 1-8 of stages 14 through 20. In other words, the bits in the first group are those within L-shaped position 611 (FIG. 6) of mask L1. The bits applied to OR gate 702 are those in vertical strip 613 and center position 612 of L1. The bits applied to OR gate 703 are those in horizontal strip 614 and center position 612. It is thus apparent that AND gate 701 will produce the signal l1 when the following three conditions are satisfied.

1. All contents of the register bits covered by the L-shaped portion 611 (the first nineteen bits in the 8-th to 13-th stages and the first eight bits in the 14-th to 20-th stages) are "WHITE" (logic 0).
2. At least one of the contents of the register bits covered by the center portion 612 and the vertical strip portion 613 (the 9-th to 19-th bits in the 14 th stage) is a "BLACK" (logic 1).
3. At least one of the contents of the register bits covered by the center portion 612 and the horizontal strip portion 614 (the 9-th bits in the 14-th to 20-th stages) is BLACK (logic 1).

The word end detectors 362-368 are substantially identical to detector 361 except that they are supplied with the contents of the register bits covered by the front-end mask L2 - L4 and the rear end masks R1 - R4, respectively, and generate the front end signals $l_2 - l_4$ and the rear end signals $r_1 - r_4$, respectively.

Figure 8:
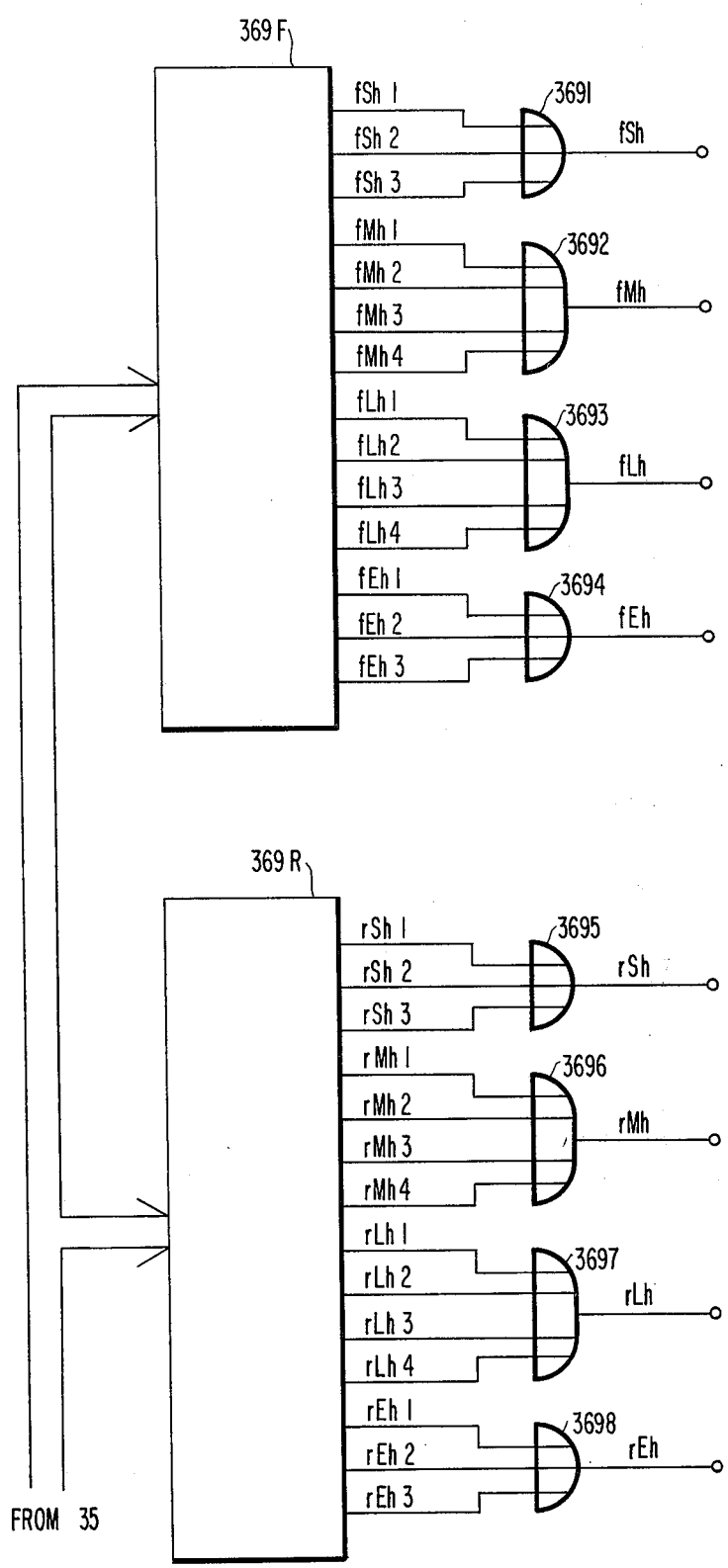
FIG. 8 is a block diagram of a height detector.
Figure 9:
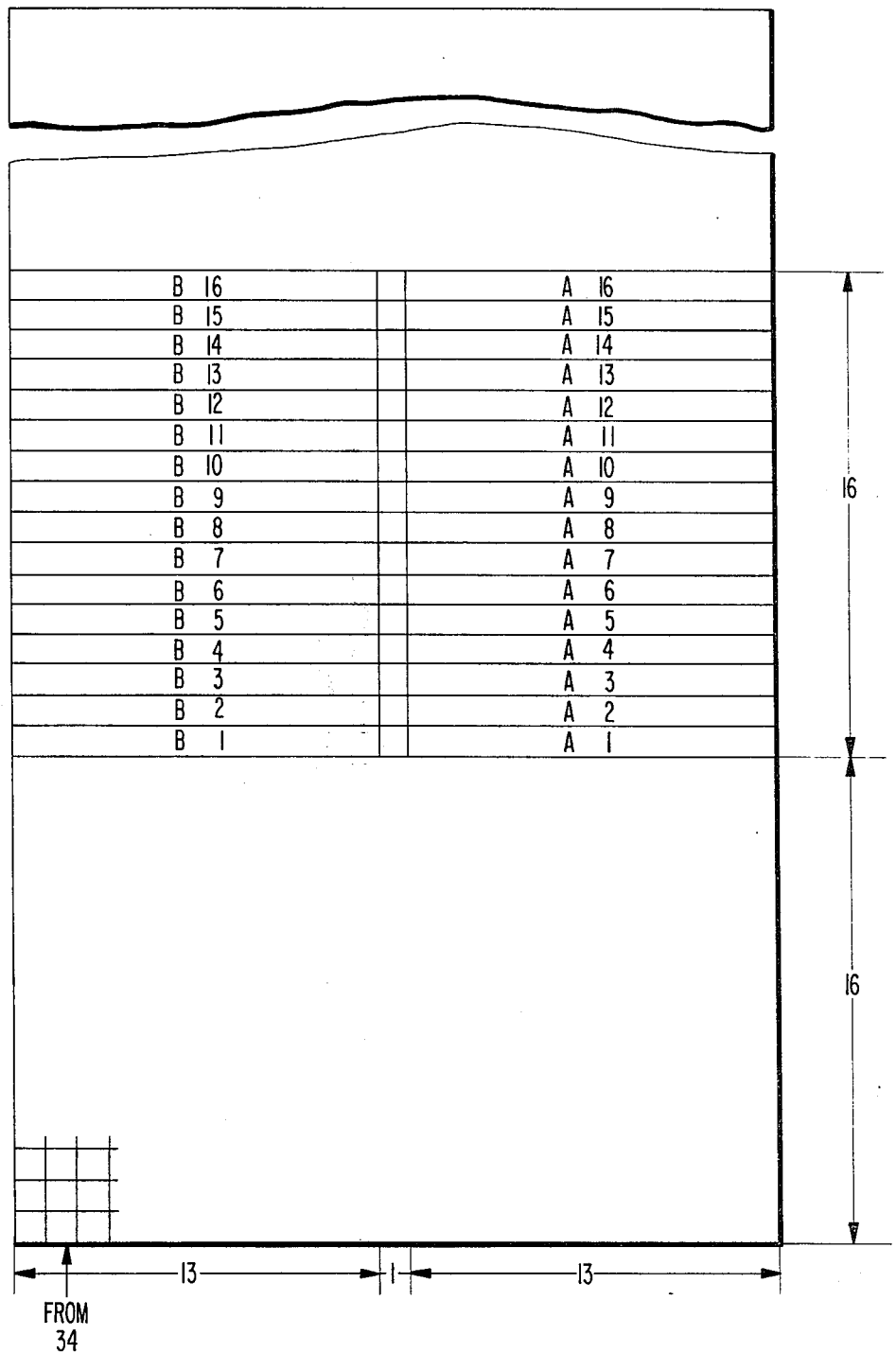
FIG. 9 is another view of the shift register illustrating the relationship of the data therein to the height detector.

The height detector 369 shown in block form in FIG. 8 is supplied with the contents of the register bits of registers 35, which cover horizontal lines A1 - A16 and B1 - B16 shown in FIG. 9, i.e., the 17-th to 32-th bits in each of the 27 stages. The horizontal line A1 covers the 17-th bits in the 14-th to 27-th stages. Similarly, the horizontal lines A2 to A16 cover the 18-th to 32-th bits, respectively, in the 14-th to 27-th stages. Further, the horizontal lines B1 - B16 cover the 17-th to 32-th bits, respectively, in the 1st to 14-th stages.

The height detector 369 generates a height signal representing the character size with four kinds of sizes S (small size) for 2.50 ~ 3.43 mm height; M (medium size) for 3.43 ~ 4.68 mm height; L (large size) for 4.68 ~ 5.93 mm height; and E (extra large size) for 5.93 ~ 6.86 mm height. The sizes S, M, L and E correspond to lines A1 - A3 and B1 - B3, A4 - A7 and B4 - B7, A8 - A11 and B8 - B11, and A12 - A14 and B12 - B14, respectively.

It will be noted that the assumption is made herein that the line gap, i.e., the distance between every two neighboring character lines is greater than 0.7 mm, which is greater than the width of two horizontal scanning lines (0.312 × 2 mm).

The height detector 369 (FIG. 8) generates a height signal only when the following conditions are satisfied:

1. At least one of the contents of the register bits covered by any one of the lines A1 - B16 is BLACK (logic 1).
2. The contents of register bits of two lines above the line mentioned in the condition (1) are WHITE (logic 0). In other words, the detector 369 performs the following calculations.

$A1 \times \overline{A2} \times \overline{A3} = fSh1$    $B1 \times \overline{B2} \times \overline{B3} = rSh1$ -continued $A2 \times \overline{A3} \times \overline{A4} = fSh2$ $A3 \times \overline{A4} \times \overline{A5} = fSh3$ $A4 \times \overline{A5} \times \overline{A6} = fMh1$ $\vdots$ $A7 \times \overline{A8} \times \overline{A9} = fMh4$ $A8 \times \overline{A9} \times \overline{A10} = fLh1$ $\vdots$ $A11 \times \overline{A12} \times \overline{A13} = fLh4$ $A12 \times \overline{A13} \times \overline{A14} = fEh1$ $A13 \times \overline{A14} \times \overline{A15} = fEh2$ $A14 \times \overline{A15} \times \overline{A16} = fEh3$    $B14 \times \overline{B15} \times \overline{B16} = rEh3$ where, Ax signifies that at least one of the bits in the line Ax is "BLACK", and $\overline{Ax}$ signifies all of the bits in the line Ax are "WHITE".

Figure 10:
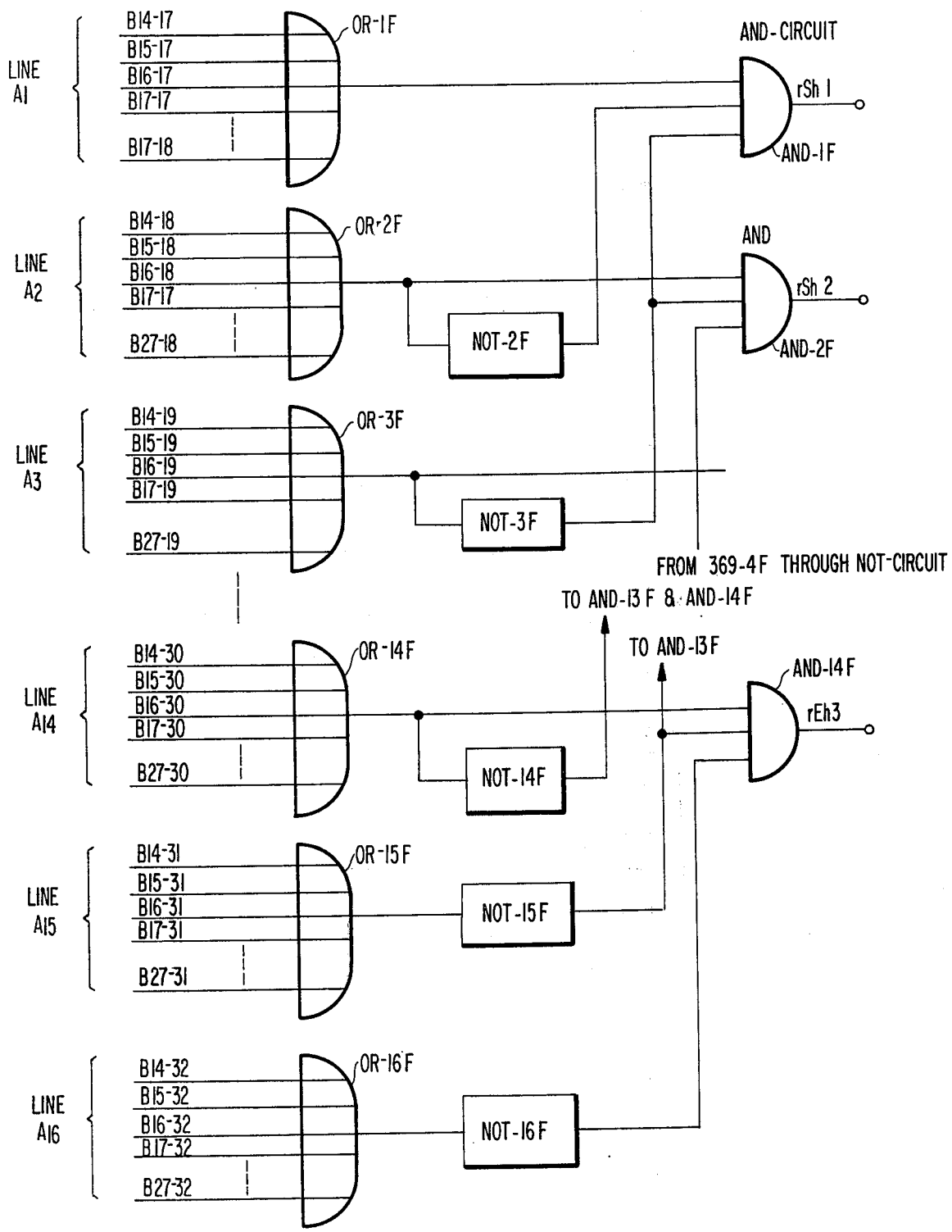
FIG. 10 is a block diagram of details of a part of the height detector of FIG. 8.

For this purpose, the height detector 369 comprises two detectors 369F and 369R, each comprising sixteen OR gates, fifteen NOT-circuits, and fourteen AND gates. The detector 369F is shown in FIG. 10. The detector 369R is identical to the detector 369F in construction.

When at least one of bits in the line A1 is BLACK (binary 1), the output of OR-1F is 1. When all the bits in the line A2 are WHITE (logic 0), the output of OR-2F is 0 and the output of NOT-2 is 1. Similarly, when all the bits in the line A3 are WHITE, the output of OR-3F is 1. Therefore, fSh1 can be obtained at the output AND-1F.

Similarly, outputs fSh2, fSh3, fMh1 ... fEh3 are obtained at the outputs of AND-2F, AND-3F, AND-4F ... AND-14F.

Figure 11:
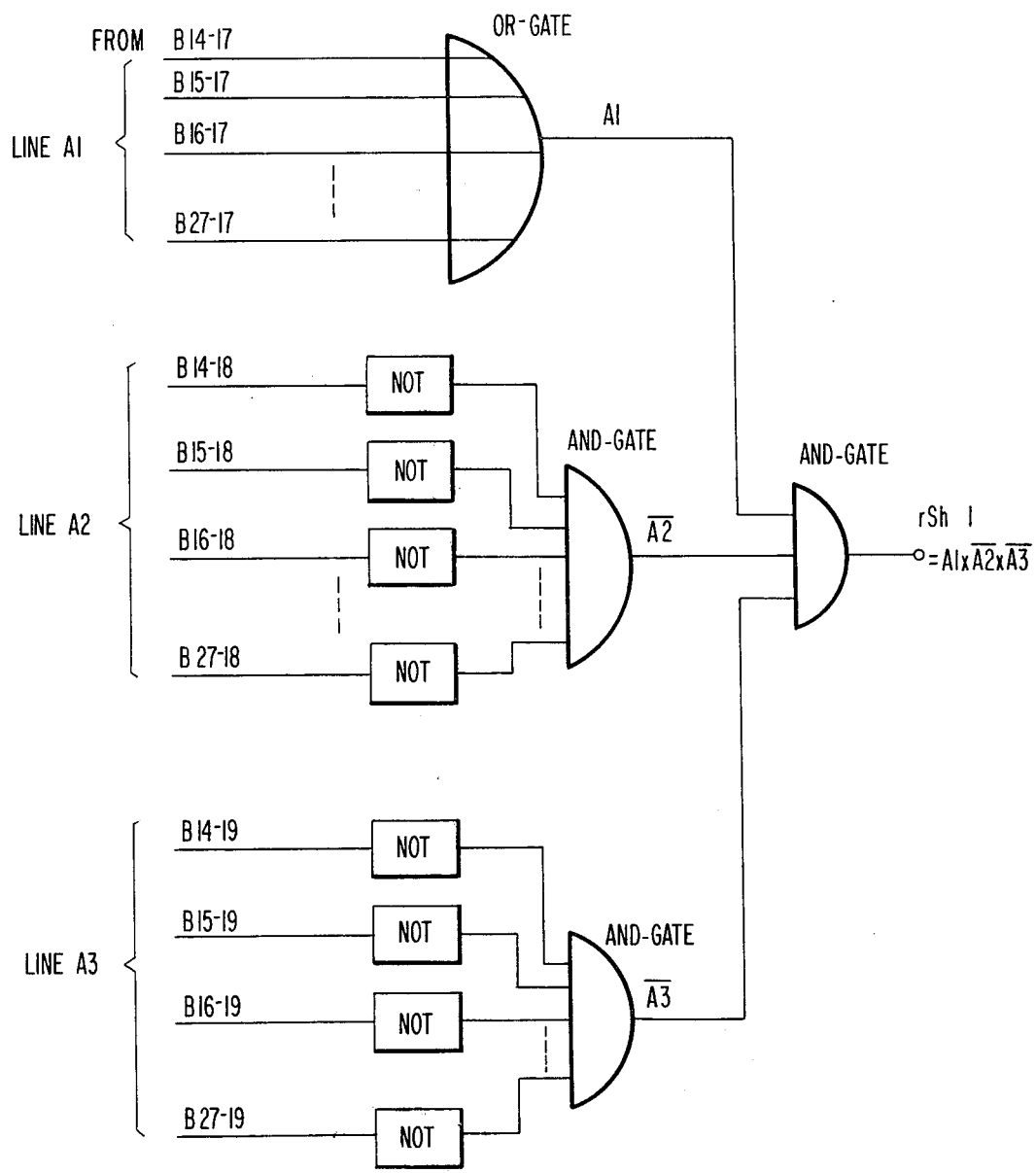
FIG. 11 is a block diagram of an alternative example of a height detector.

The logic equations for fSh1 - rEh3, given above, can also be implemented by other circuitry than that shown in FIG. 10. FIG. 11, for example illustrates another example for generating fSh1. Identical circuitry can generate fSh2 - rEh3.

Referring back to FIG. 8, the height detector 369 also comprises eight OR gates 3691-3698 for generating the height signals fSh, fMh, fLh, fEh, rSh, rMh, rLh, and rEh, respectively according to the following logic formulae.

$fSh = fSh1 + fSh2 + fSh3$ $fMh = fMh1 + fMh2 + fMh3 + fMh4$ $fLh = fLh1 + fLh2 + fLh3 + fLh4$ $fEh = fEh1 + fEh2 + fEh3$ $rSh = rSh1 + rSh2 + rSh3$ $rMh = rMh1 + rMh2 + rMh3 + rMh4$ $rLh = rLh1 + rLh2 + rLh3 + 4Lh4$ $rEh = rEh1 + rEh2 + rEh3$

Figure 12:
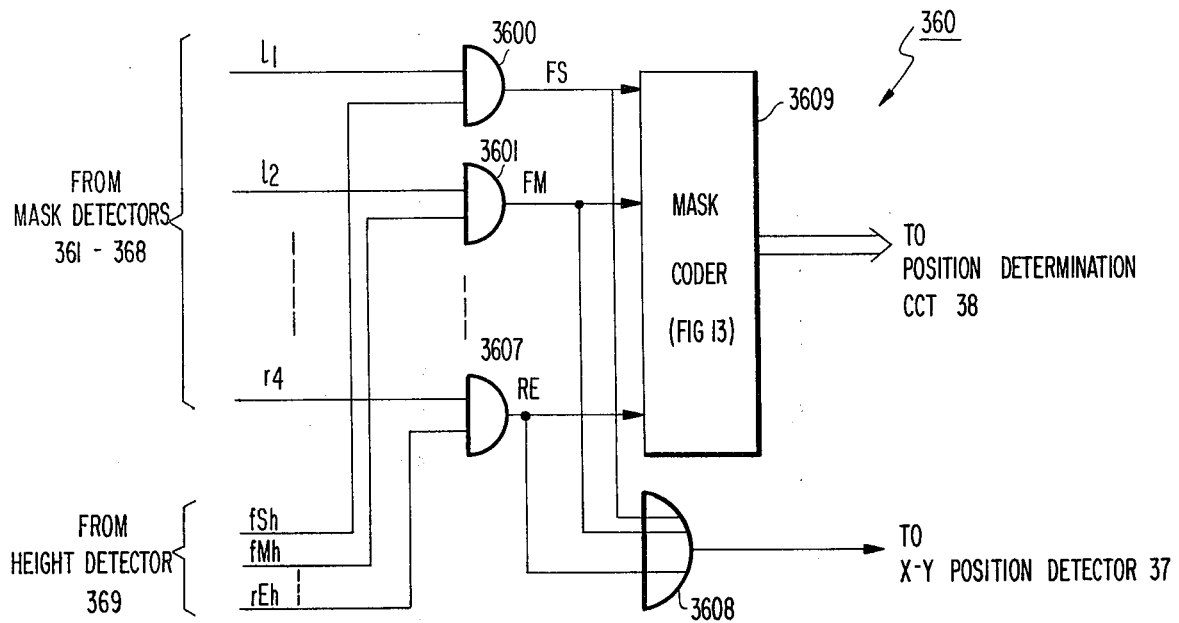
FIG. 12 is a block diagram of the details of a mask detector.

The mask detector 360 is composed of eight AND-gates 3600-3607, an OR-gate 3608, and a mask coder 3609, as shown in FIG. 12.

The AND-gates 3600-3607 perform the calculations of the following equations, respectively, to provide the mask signals FS, FM, FL, FE, RS, RM, RL and RE:

| | |
|---|---|
| FS = l₁ × fSh | RS = r₁ × rSh |
| FM = l₂ × fMh | RM = r₂ × rMh |
| FL = l₃ × fLh | RL = r₃ × rLh |
| FE = l₄ × fEh | RE = r₄ × rEh |

The mask signals are supplied to the mask coder 3609 and to the OR gate 3608, which provides a mask existing signal ME to the X-Y position detector 37.

The mask coder 3609 generates a 4-bit coded mask signal MC representing one of the mask signals in the following bit-construction:

| | |
|---|---|
| FS : 1000 | RS : 1100 |
| FM : 1001 | RM : 1101 |
| FL : 1010 | RL : 1110 |
| FE : 1011 | RE : 1111 |

Figure 13:
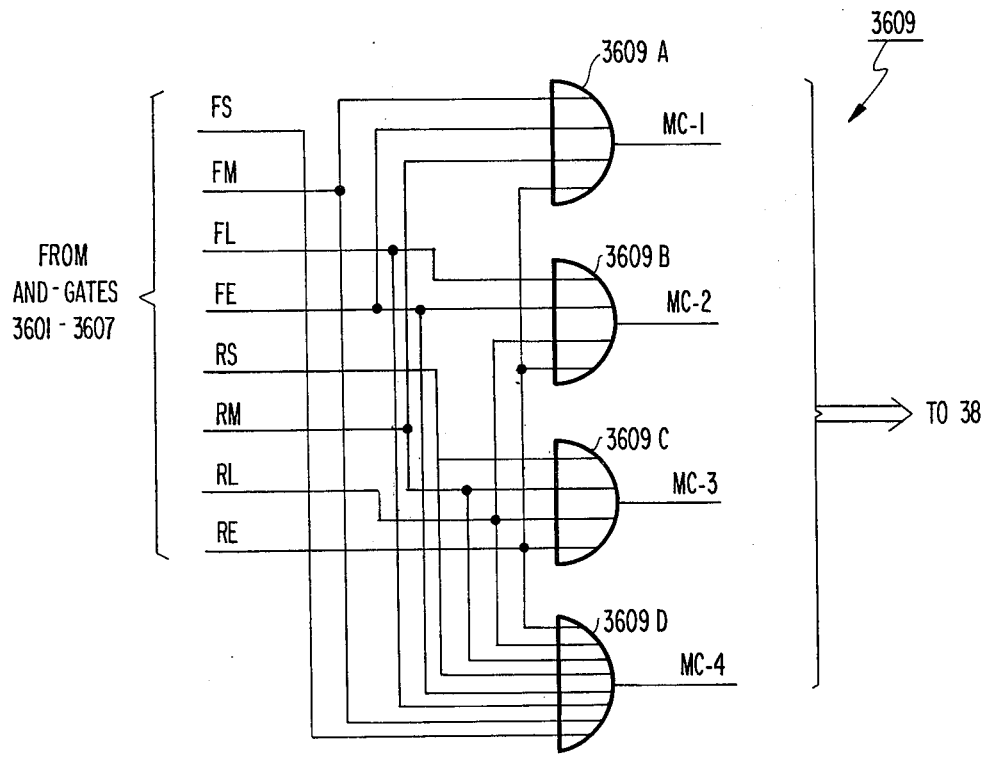
FIG. 13 is a block diagram of a mask coder.

The mask coder 3609 is shown in detail in FIG. 13 and comprises four OR-gates 3609A, 3609B, 3609C, and 3609D for providing first-, second-, third- and four-order bits MC-1 ~ MC-4 of the 4-bit coded mask signal MC. The fourth-order bit MC-4 represents the existence of the mask signal MC. The third-order bit MC-3 designates whether the mask signal is an F signal or an R signal. The first- and second-order bits MC-1 and MC-2 represent the size of the word end.

Figure 14:
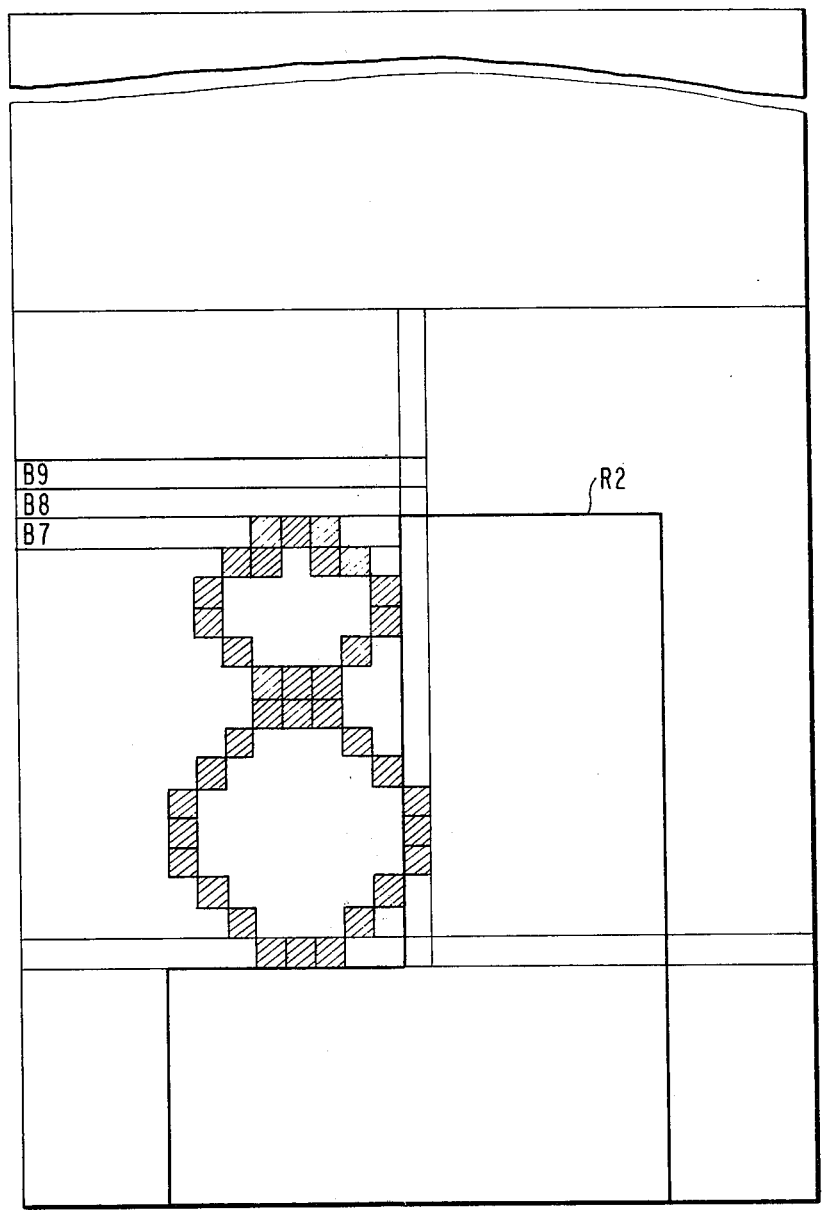
FIG. 14 is another view of the shift register illustrating the position of data bits therein when a certain character is detected.

FIG. 14 illustrates the relationship between a character stored in register 35 and the signals generated by the mask detecting means 36. The drawing shows the condition of the register (black squares represent storage of binary 1-bit) following a scan of the last character 8 of the postal code on the mail item 10 (FIG. 1). The word end signals $r_1$, $r_2$, $r_3$ and $r_4$ are obtained from the word end detectors 365–368, respectively. The height signal rMh4 is obtained from the AND-7R of the detector 369R, which is then applied to the OR-gates 3696 to provide the height signal rMh.

The word signals $r_1 - r_4$ and the height signal rMh are supplied to the AND gates of the mask detector 360, whereby the mask signal RM is obtained from the AND gate 3605. The mask signal RM is then supplied to the OR gate 3608 and the mask coder 3609 to provide the mask existing signal ME and the coded mask signal MC of 1101, respectively.

The position detector 37, which receives the mask existing signal ME, is similar in function to the apparatus shown in Spanjersberg U.S. Pat. No. 3,846,753, specifically the combination of the counters 6 and 7 and the two AND gates shown in FIG. 2 of the reference.

Figure 15:
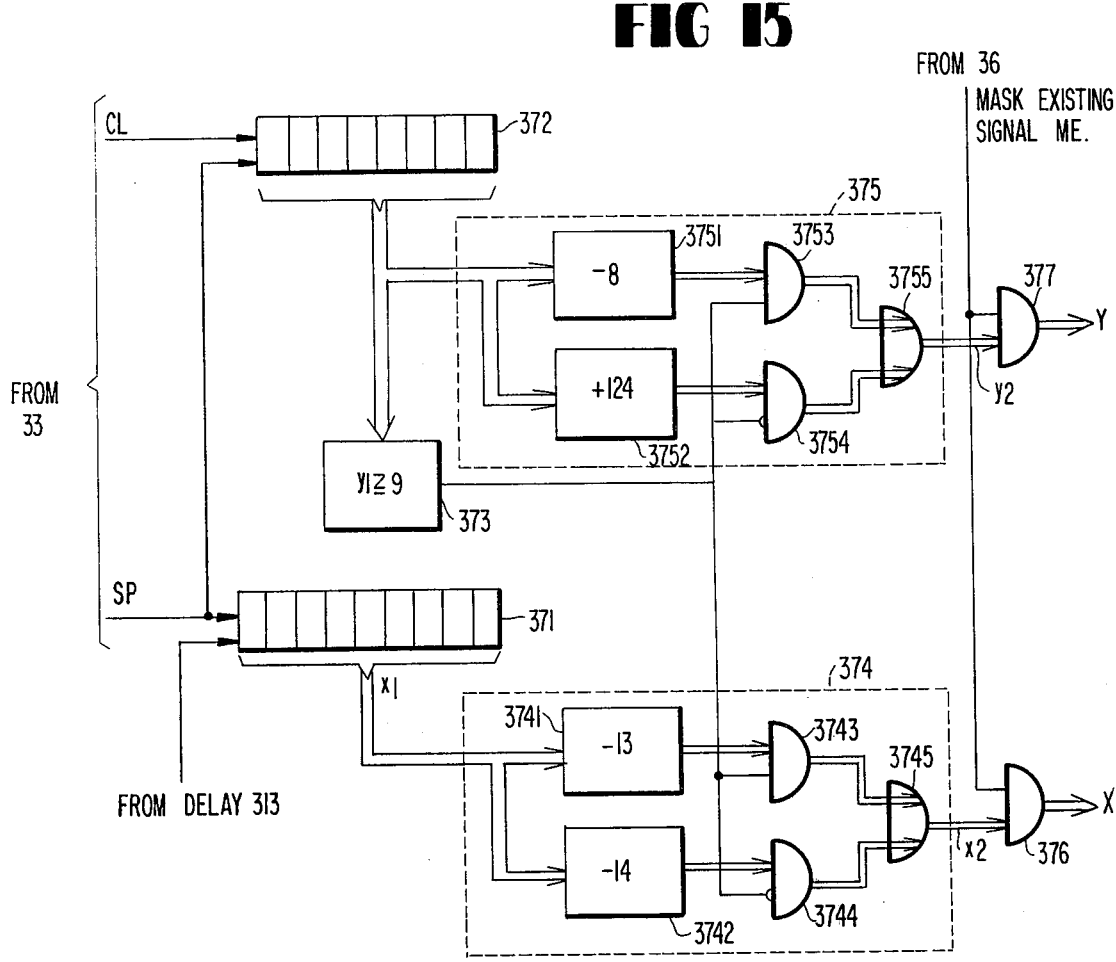
FIG. 15 is a block diagram of a position detector.

The position detector 37 is shown in FIG. 15 and comprises an X-counter 371, a Y-counter 372, a comparator 373, and X-counter compensator 374, a Y-counter compensator 375, and AND-gates 376 and 377.

The X-counter 371 counts the start pulse SP and is reset by the delayed signal from the delay circuit 313. The Y-counter 372 counts the clock pulse CL and is reset by the start pulse SP. Thus, the values instantaneously registered in the X- and Y- counters 371 and 372 represent instantaneously X and Y positions of the scanning system. However, since a black 1 bit generated in the scanning system will not reach the center of the masks (the center is 612, 622, etc. in FIG. 6) until 1,724 clock pulse periods after it is first scanned (132 bits/column × 13 column + 8 bits in the 14th column), the overall timing is delayed by 1724 clock pulse periods to effectively bring the mask signal into coincidence with the scanning point.

The relationship between the point under scanning (which corresponds to the first bit in the first stage ($B_{1-1}$) of the shift register 35) and the center portion (which is the 9th bit in the 14th stage ($B_{14-9}$)) is given by $$x_2 = x_1 - 13 \atop y_2 = y_1 - 8 \Big\} \text{ for } 9 \leq y_1 \leq 132$$

$$x_2 = x_1 - 14 \atop y_2 = y_1 + 124 \Big\} \text{ for } 1 \leq y_1 \leq 8$$

where $x_1$ and $y_1$ stand for the counted values of the X- and Y-counters 371 and 372, respectively, and $x_2$ and $y_2$ for the compensated values for the center portion.

In order to obtain the compensated values, there is provided a comparator 373, and compensators 374 and 375. The comparator 373 compares the counted value $y_1$ of the Y-counter 372 with a predetermined value, i.e., 8, and generates a pulse (logic 1) when $y_1 \geq 9$. The compensator 374 comprises subtractors 3741 and 3742 for performing calculations $x_1-13$ and $x_1-14$, respectively, an AND-gate 3743, an inhibit gate 3744, and an OR-gate 3745. Thus, when $y_1 \geq 9$, the output value $x_2$ of the compensator 374 is $x_1-13$, and when $y_1 \leq 8$, $x_2$ is $x_1-14$.

Similarly, the compensator 375 comprises a subtractor 3751 for performing the calculation $y_1-8$, an adder 3752 for performing the calculation $y_1+124$, an AND-gate 3753, an inhibit gate 3754, and an OR-gate 3755. Thus, when $y_1 \geq 9$, the output value $Y_2$ of the compensator 375 is Y-8, and when $y_1 \leq 8$, $y_2$ is $y_1+124$.

The compensated values $x_2$ and $y_2$ are supplied to the AND-gates 376 and 377, respectively, which are also supplied with the mask existing signal ME from the mask detecting means 36. Therefore, every time the mask signal is obtained, the position signals X and Y for representing its position are obtained at the output terminals of the AND-gates 376 and 377. The position signals X and Y are then supplied to the position determination circuit 38.

Figure 16:
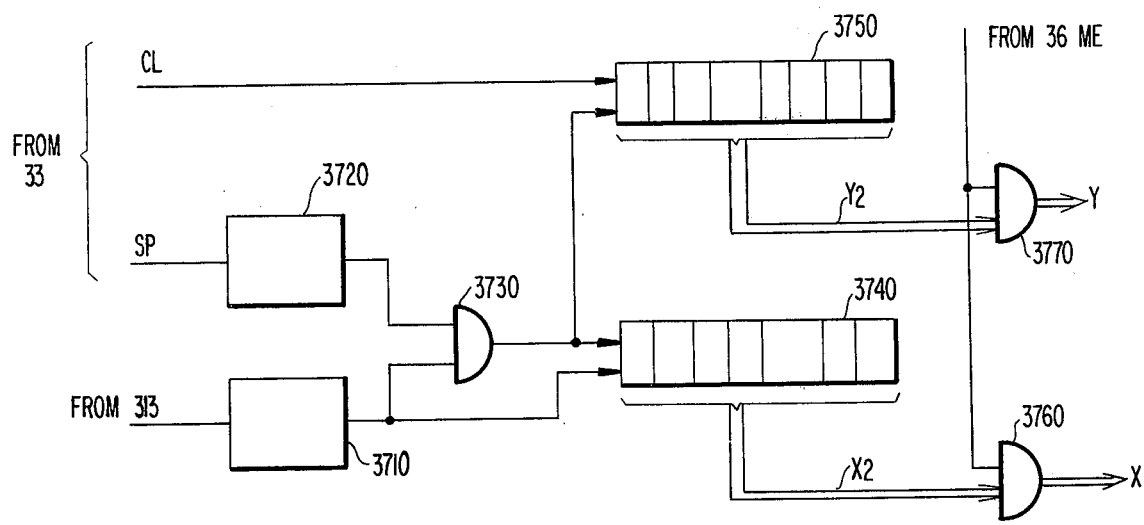
FIG. 16 is a block diagram of a second example of a position detector.

FIG. 16 shows another example of the X-Y position detector 37, which comprises delay circuits 3710 and 3720, an AND gate 3730, an X-counter 3740, a Y-counter 3750, and AND-gates 3760 and 3770.

The delay circuits 3710 and 3720 delays the signal supplied from the delay circuit 313 and the starting pulse SP from the clock pulse generator 33, respectively, 1724 clock pulse periods. The delayed start pulse from the delay circuit 3720 is applied through the AND-gate 3730 to the X-counter 3740 for counting the delayed start pulse only when the signal from the delayed circuit 3710 is applied thereto. The Y-counter 3750 counts the clock pulse CL and is reset by the delayed start pulse from the AND-gate 3730. Therefore, the output values of the X- and Y-counters 3740 and 3750 are the signals $x_2$ and $y_2$, respectively. The signals $X_2$ and $Y_2$ are supplied to the AND-gates 3760 and 3770, respectively, in which they are AND-gated with the mask existing signal ME from the mask detecting means 36 to provide the position signals X and Y.

The position determination circuit 38 is supplied with the 4-bit coded mask signal MC from the mask detecting means 36 and the position signals X and Y from the X-Y position detector 37, and based on these signals, it detects the position of the postal code. The coded mask signal MC represents the type of the word ending detected and the character size (S, M, L, or E), with the former being represented by the third order bit MC-3 (binary 0 corresponds to the front end, and 1 to the rear end), and the latter being represented by the first- and second-order bits MC-1 and MC-2. The position signals X and Y represent the position (X, Y) on the X-Y plane of the center portion of the word ending.

The manner in which the position determination circuit generates will be better understood following a description of its philosophy of operation based on FIGS. 17A, B and C and 18A, B and C. In FIG. 17, the circles represent the points within the scanned X-Y field where a word end is detected. The subscripts used, e.g. Xi Yi, designate the i-th word end detected. The circles connected by lines represent the rear and front ends of a word. As shown in FIG. 17 there are three groups of words in the field, 75, 76 and 77. The words in group 76 are skewed. The X-Y field or plane has a reference point (1, 1) corresponding to the start position of the scanning, and the values of X and Y increase in the scanning direction.

The detected word ends are shown plotted in the X-direction as shown in FIG. 17B. The plotted word ends are compared with the adjacent ones to detect distances between two adjacent plotted word ends. The plotted word ends are separated into one or more groups so that the distance between two adjacent word ends which are included in different groups is greater than a predetermined value, e.g., $\delta x$. In FIG. 17B, the word ends divided into two groups 71 and 72, because $X_8 - X_7 > \delta x$. The word ends are shown plotted in the Y-direction in FIG. 17C. There, two groups, 73 and 74, are obtained, because $Y_{20} - Y_{13} > \delta_Y$.

By the grouping in the X- and Y-directions, the word ends in X-Y plane are separated one or more word end blocks. In FIG. 17A, three word end blocks 75, 76 and 77 are shown.

The word ends of every word end block are plotted in the Y-direction for the purpose of detecting a skew of the words. The plots are shown in FIGS. 18A, B, and C, corresponding relatively to the word end blocks 75, 76, and 77. The plotted word ends are compared with adjacent ones thereof to detect plotted word end subgroups in which a plurality of plotted word ends are included and in which the word end distance between adjacent plotted word ends is less than a predetermined value $\beta$. Further, the sub-group width W and the sub-group distance D are obtained to provide the ratio D/W. If there are no sub-groups separated by $\beta$, or if the sub-groups detected have a ratio D/W which is less than a predetermined value $\gamma$, the words in the word block are considered as being skewed.

The word ends in those word end blocks which are determined to be skewed are compensated in the following manner:

The transformation of the coordinate system is performed in accordance with the following equations.

$$X' = X \cos\theta + Y \sin\theta$$

$$Y' = Y \cos\theta - X \sin\theta$$

where $\theta$ is the skew angle and is positive for words in which the front word end position Y-value is greater than the rear word end position Y-value such as the words in block 76 in FIG. 17A.

By applying a particular value to the angle $\theta$ in the order of $+1°, -1°, +2°, -2°, \ldots$, the transformation of the coordinate system is performed. Every time the transformation of the coordinate system is performed with respect a particular value, the plotting is achieved and the skew detection is achieved. The particular value by which no-skew is detected is considered as the skew angle $\theta$. The word end position signals X and Y are compensated in accordance with the detected skew angle $\theta$ to provide the compensated position signals X' and Y'.

Therefore, the postal code detection is performed on every word line in the block. The postal code to be detected in the specific example described herein should satisfy the following conditions:

1. The word ends are arranged in the order of the rear end, the front end, the rear end, ..., i.e., R, L, R. L ..., in each word end line.
2. The word size combination of the rear and front ends does not include the combinations of S-L (small-large), S-E (small-extra large), and M-E (medium-extra large).
3. The word length $X_L - X_R$ is 3-character length satisfying $\delta_1 < X_L - X_R < \delta_2$.

The values $\delta_1$ and $\delta_2$ depend on the word size combination. An example of the values $\delta_1$ and $\delta_2$ is as follows:

| Word Size Combination | $\delta_1$ (mm) | Number of bits | $\delta_2$ (mm) | Number of bits |
|---|---|---|---|---|
| S - S | 5.31 | 17 | 7.19 | 23 |
| S - M | 6.25 | 20 | 8.44 | 27 |
| M - M | 7.19 | 23 | 10.00 | 32 |
| M - L | 8.44 | 27 | 10.94 | 35 |
| L - L | 10.00 | 32 | 12.50 | 40 |
| L - E | 10.94 | 35 | 13.44 | 43 |
| E - E | 12.50 | 40 | 14.69 | 47 |

4. The postal code is put above or in line with the uppermost line of the address.

When the result of the detection shows only one word, that word is considered as the postal code. If the result shows a plurality of words, the word having a minimum value of the Y-position signal is recognized as the postal code.

Figure 19:
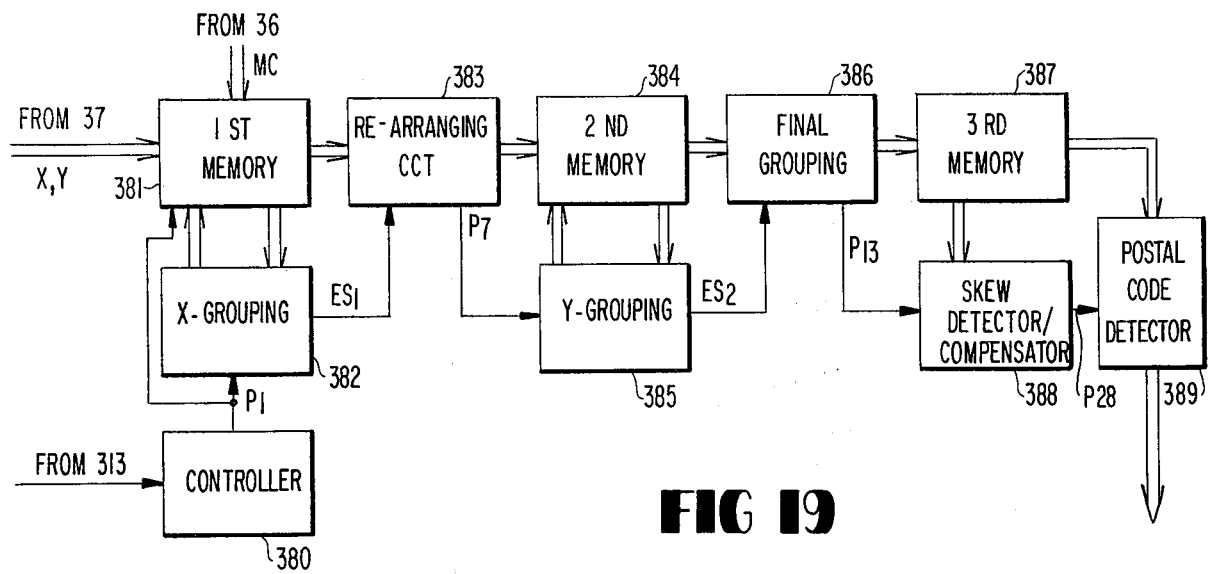
FIG. 19 is a block diagram of a position determination circuit.

To perform the above mentioned postal code detection, the position determination circuit 38 comprises, as shown in FIG. 19, a controller 380, a first memory 381, an x-direction grouping circuit 382, a re-arranging circuit 383, a second memory 384, a Y-direction grouping circuit 385, a final grouping circuit 386, a third memory 387, a skew detector/compensator 388, and a postal code detector 389.

The coded mask signal MC for the word end and the corresponding position signals X and Y are supplied to the first memory 381 for storage therein in the order of the X-signal. The signals MC, X, and Y are stored in the memory at addresses 0 through n as follows:

| ADDRESS | MC | X | Y | X-Group Code |
|---|---|---|---|---|
| 0 | $MC_0$ | $X_0$ | $Y_0$ | |
| 1 | $MC_1$ | $X_1$ | $Y_1$ | |
| 2 | $MC_2$ | $X_2$ | $Y_2$ | |
| 3 | $MC_3$ | $X_3$ | $Y_3$ | |
| . | . | . | . | |
| n | $MC_n$ | $X_n$ | $Y_n$ | |

-continued

Figure 20:
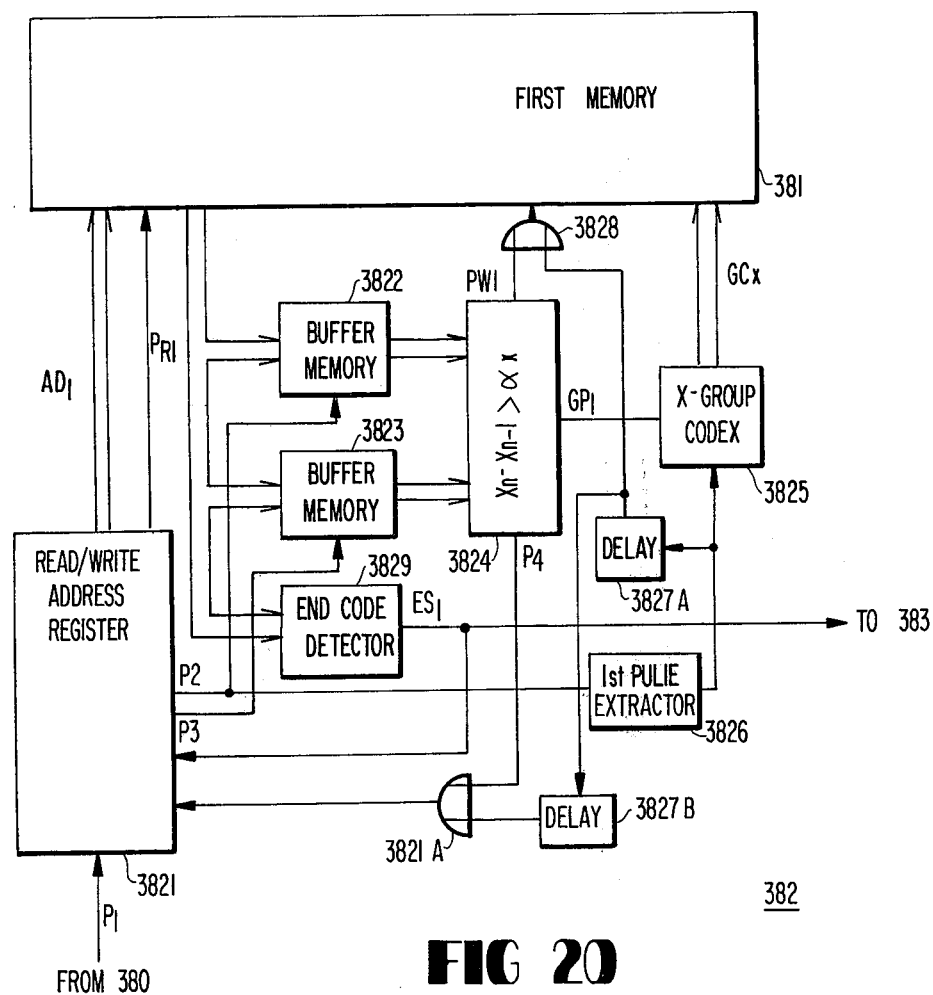
FIG. 20 is a block diagram of an X-direction grouping circuit which forms a part of FIG. 19.

| ADDRESS | MC | X | Y | X-Group Code |
|---------|-----|-----|-----|--------------|
| n+1 | END | END | END | | where $X_0 \leq X_1 \leq X_2 \leq X_3 \leq X_4 \leq \ldots \leq X_{n-1} \leq X_n$ When the scanning by the array 32 is completed, the end of scan signal from the delay 313 is applied to the controller 388 to obtain a pulse $P_1$. The pulse $P_1$ is supplied to the first memory 381 in which an end code is written at address $n+1$, as shown in the above table. The pulse $P_1$ is also supplied to the X-direction grouping circuit 382. The X-direction grouping circuit 382 comprises, as shown in FIG. 20, a read/write address register 3821 for designating an address, buffer memories 3822 and 3823, a comparator 3824, an X-group coder 3825, a first-pulse extractor 3826, a delay circuit 3827, an OR-gate 3828, and an end code detector 3829.

When the pulse $P_1$ is supplied to the address register 3821, the address data $AD_1$ for designating the read/write addresses and a read command signal $P_{R1}$ are supplied in turn to the first memory 381 to read out the position signals X ($X_0, X_1, X_2, \ldots X_n$) from the address designated by $AD_1$. The read-out position signals X are supplied alternately to the buffer memories 3822 and 3823 under controling pulses $P_2$ and $P_3$ from the address register 3821. The stored position signals X in the buffer memories 3822 and 3823 are supplied to the comparator 3824 to detect the difference $X_n - X_{n-1}$ which is then compared with a predetermined value $\alpha_X$. Only when $X_n - X_{n-1} > \alpha_X$, the comparator 3824 generates a grouping pulse $GP_1$ which is supplied to the X-group coder 3825. The coder 3825 is supplied with the first pulse of the pulse train $P_2$ from the first pulse extractor 3826, whereby the coder 3825 generates the X-group code $GC_X$ of 001 representing the first X-group. The code $GC_X$ of 001 is supplied to first memory 381 and stored in an X-group code column at address 0 under control the address data $AD_1$ and the delayed first pulse of the pulse train $P_2$ through the delay circuit 3827A and the OR-gate 3828. In other words, after the first position signal $X_0$ stored at address 0 is read out and stored in the buffer memory 3822, the X-group code $GC_X$ of 001 is stored in the first memory 381. Immediately after that, the delayed pulse from the delay circuit 3827A is supplied through the delay circuit 3827B and the OR-gate 3821A to the address register 3821, whereby $AD_1$ is converted to address 1.

Then, the second position signal $X_1$ is read out and stored in the buffer memory 3823. The signals $X_0$ and $X_1$ are supplied to the comparator 3824, in which the difference $X_1 - X_0$ is compared with the value $\alpha_X$. Because the difference $X_1 - X_0$ is less than the value $\alpha_X$ in FIG. 17B, the grouping pulse $GP_1$ is not generated, whereby the group code $GC_X$ from the coder 3825 remains at 001. When the comparison between $X_1 - X_0$ and $\alpha_X$ has been completed, the comparator 3824 generates a write command signal Pw1 which is supplied to the first memory 381 through the OR-circuit 3828. The code $GC_x$ of 001 is stored in the X-group code column at address 1 under the control of address data $AD_1$ and the write signal Pw1. Further, the comparator 3824 generates a pulse $P_4$, which is supplied to the address register 3821 for advancing the address data $AD_1$ to address 2. Then, the third position signal $X_2$ is read out under control of the address 2 and stored in the buffer memory 3822. The signal $X_2$ is compared with the signal $X_1$ stored in the buffer memory 3823 to obtain the difference $X_2 - X_1$. The difference $X_2 - X_1$ is compared with value $\alpha_X$. In FIG. 17B, because $X_2 - X_1 < \alpha_X$, the code $GC_X$ of 001 is maintained and written in the X-group code column at address 2 of the first memory 381. Similarly, the code $GC_X$ of 001 is written in the X-group code column at addresses 3 to 7 of the first memory 381 corresponding to the signals $X_3$ to $X_7$, respectively.

When the signal $X_8$ is read out and stored in the buffer memory 3822, the buffer memory 3823 stores the signal $X_7$. Because $X_8 - X_7 > \alpha_X$ in FIG. 17B, the comparator 3824 generates the grouping pulse $GP_1$, whereby the code $GC_X$ of 010 is obtained from the coder 3825. Therefore, the code of 010 is written in the X-group code column at address 8 of the first memory 381.

Thus, every time the comparison of the difference between adjacent signals X with the value $\alpha_X$ has been completed, the code $GC_X$ is written in the X-group code column at the corresponding address. When address data $AD_1 = n$, corresponding to the last position signal $X_n$, is supplied to the first memory, the end code is read out and is supplied to an end code detector to provide an end signal $ES_1$. The latter signal is applied to the address register 3821 to cause it to stop generating the address data $AD_1$ and the read signal $P_{R1}$. Thus, in the first memory 381, not only the signals MC, X, and Y but also the X-group codes $GC_X$ are stored in the memory as follows:

| ADDRESS | MC | X | Y | X-Group Code |
|---------|-----|-----|-----|--------------|
| 0 | $MC_0$ | $X_0$ | $Y_0$ | 001 |
| 1 | $MC_1$ | $X_1$ | $Y_1$ | 001 |
| 2 | $MC_2$ | $X_2$ | $Y_2$ | 001 |
| . | . | . | . | . |
| . | . | . | . | . |
| 7 | $MC_7$ | $X_7$ | $Y_7$ | 001 |
| 8 | $MC_8$ | $X_8$ | $Y_8$ | 010 |
| . | . | . | . | . |
| . | . | . | . | . |
| n | $MC_n$ | $X_n$ | $Y_n$ | 010 |
| n+1 | END | END | END | END |

Referring back to FIG. 19, the end signal $ES_1$ is also supplied to the re-arranging circuit 383, which re-arranges the data received from the first memory 381 into an order dependent on the signals Y, and transfers the re-arranged data to the second memory 384.

Figure 21:
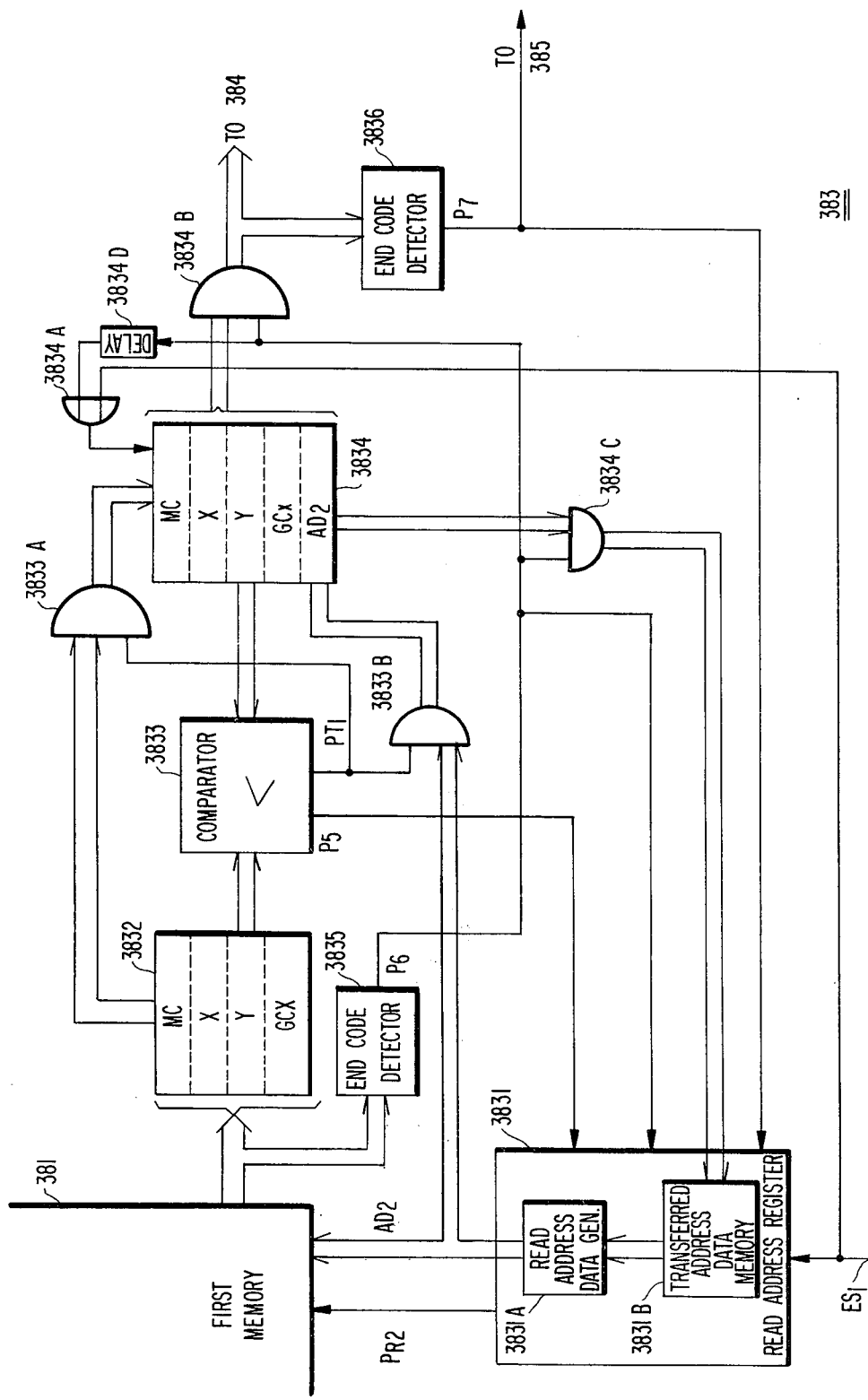
FIG. 21 is a block diagram of a rearranging circuit which forms a part of FIG. 19.

The re-arranging circuit 383 comprises, as shown in FIG. 21, a read address register 3831, a first buffer memory 3832, a comparator 3833, a second buffer memory 3834, and end code detectors 3835 and 3836.

When the end signal $ES_1$ is supplied from the X-direction grouping circuit 382 through an OR-circuit 3834A to the second buffer memory 3834, the content in the Y signal column of the second buffer memory 3834 is set to a predetermined maximum value Ym. The end signal $ES_1$ is also supplied to a read address data generator 3831A of the read address register 3831 for providing a read command signal $P_{R2}$ and read address data $AD_2$ of address 0 which are supplied to the first memory 381. The stored data ($MC_0, X_0, Y_0$, and $GC_X$) stored at the address 0 are read out. The read out data are transferred to the first buffer memory 3832 and stored therein. The signal $Y_0$ stored in the buffer memory 3832 is supplied to the comparator 3833 and compared with the signal Y stored in the buffer memory 3834. The comparator 3833 generates a transfer pulse $P_{T1}$ only when the former is less than the latter. Because the content of the second buffer memory 3834 is set to the maximum value Ym in accordance with the end signal $ES_1$, the comparator 3833 generates the transfer pulse $P_{T1}$, which is supplied to AND-gates 3833A and 3833B. Therefore, the data MC, X, Y, and $GC_X$ stored in the first buffer memory 3832 and the read address data $AD_2$ representing the address in memory 381 from which the data stored in the buffer memory 3832 was obtained, are transferred through the AND-gates 3833A and 3833B, respectively to the second buffer memory 3834 and stored therein as the new data.

When the comparison in the comparator 3833 and the data transfer from the buffer memory 3832 to the buffer memory 3834 are completed, the comparator 3833 generates a pulse $P_5$ which is supplied to the read address data generator of the address register 3831 for advancing the address data $AD_2$ from address 0 to 1. Therefore, the data ($MC_1$, $X_1$, $Y_1$ and $GC_X$) are read out and stored in the first buffer memory 3832. The stored signal $Y_1$ is compared with the signal $Y_0$ stored in the second buffer memory 3834. In FIG. 17A, because $Y_1 = Y_0$, the comparator 3833 does not transfer the pulse $P_{T1}$. Therefore, the contents of the second buffer memory 3834 are maintained. When the comparison is completed, the pulse $P_5$ is generated and renews the address data $AD_2$ from 1 to 2. The data ($MC_2$, $X_2$, $Y_2$ and $GC_X$) stored at address 2 of the first memory 381 are read out in accordance with the address data of address 2 and stored in the first buffer memory 3833. The stored signal $Y_2$ is compared with the signal $Y_0$ stored in the second buffer memory 3834. In FIG. 17C, because $Y_2 < Y_0$, the comparator 3833 generates the transfer pulse $P_{T1}$, whereby the data $MC_2$, $X_2$, $Y_2$, and $GC_X$ and the address data $AD_2$ of address 2 are transferred to the second buffer memory 3834 and stored therein as the new data.

Thus, the data (MC, X, Y, and $GC_X$) stored in the first memory 381 are in turn read out and the signals Y are in turn compared with the stored signal Y in the second buffer memory 3834. Only when the read out signal Y is less than the stored signal Y, the read out data are transferred to the second buffer memory 3834. Therefore, when the comparison of the stored signals Y ($Y_0$ to $Y_n$) is completed with respect to the addresses 0 to n, the signal Y of the minimum value and corresponding MC, X, and $GC_X$ are retained in the second buffer memory 3834. In FIG. 17C, because the signal $Y_3$ has the minimum value, the data $MC_3$, $X_3$, $Y_3$, and $GC_X$ of 001 are retained in the second buffer memory 3834.

When the comparison of the signal $Y_n$ is completed the pulse $P_5$ is generated and supplied to the read address register 3831, whereby the address data $AD_2$ is advanced from n to n + 1. In accordance with the address data of n + 1, the end code is read out and transferred to the first buffer memory 3832 and the end code detector 3835 which generates a pulse $P_6$. The pulse $P_6$ from the end code detector 3835 is supplied to AND-circuits 3834B and 3834C through which the stored data $MC_3$, $X_3$, $Y_3$, and $GC_X$ (001), and the stored address data of 3 are transferred to the second memory 384 and a transferred address data memory of the read address register 3831, respectively. The data ($MC_3$, $X_3$, $Y_3$ and $GC_X$) transferred to the second memory 384 are stored at address 0 thereof. The pulse $P_6$ is also supplied from the end code detector 3835 through a delay circuit 3834D and the AND-circuit 3834A to the second buffer memory 3834, whereby the contents thereof are set to the predetermined maximum value.

The pulse $P_6$ is further supplied to the read address data generator 3831A of the address register 3831, whereby the address data $AD_2$ is set to address 0. The address data generator 3831A provides in turn the address data $AD_2$ of addresses 0 to n + 1 except for the address 3 stored in the transferred address data memory 3831B. Therefore, when the comparison is completed with respect to the signals Y stored at addresses 0 to n + 1 except for 3, the data $MC_6$, $X_6$, $Y_6$ and $GC_X$ (001) are transferred to the second memory 384 and the address data of 6 is stored in the transferred address data memory 3831B.

Similarly, the data (MC, X, Y and $GC_X$) are transferred to the second memory 384 in the order of value of the signals Y. After the data $MC_{n-1}$, $X_{n-1}$, $Y_{n-1}$, $GC_X$ of 010 in which signal $Y_{n-1}$ is greatest in the signals Y are transferred to the second memory 384, the read address data generator generates only the address data $AD_2$ of n+1 because the address data of 0 to n are stored in the address data memory 3831B. In accordance with the address data $AD_2$ of n+1, the end code is read out and stored in the first buffer memory 3832. Because the end code is defined so that it has a value greater than all the signals but less than the predetermined value Ym, the end code is transferred to the second buffer memory 3834, and then transferred through the AND-cuicuit 3834B to the second memory 384 in accordance with the pulse $P_6$ from the end code detector 3835. The end code from the AND-circuit 3834B is supplied to the end code detector 3836 for generating a pulse $P_7$. The pulse $P_7$ is supplied to the read address register 3831 to reset it the initial condition.

Thus, the data re-arranging is completed and the data (MC, X, Y, and $GC_X$) are stored in the second memory 384 in the order of the value of the signals Y as follows:

| ADDRESS | MC | X | Y | $GC_X$ | $GC_Y$ |
|---|---|---|---|---|---|
| 0 | $MC_3$ | $X_3$ | $Y_3$ | 001 | |
| 1 | $MC_6$ | $X_6$ | $Y_6$ | 001 | |
| 2 | $MC_2$ | $X_2$ | $Y_2$ | 001 | |
| 3 | $MC_5$ | $X_5$ | $Y_5$ | 001 | |
| 4 | $MC_{14}$ | $X_{14}$ | $Y_{14}$ | 010 | |
| 5 | $MC_8$ | $X_8$ | $Y_8$ | 010 | |
| 6 | $MC_0$ | $X_0$ | $Y_0$ | 001 | |
| 7 | $MC_1$ | $X_1$ | $Y_1$ | 001 | |
| . | . | . | . | | |
| n−1 | $MC_{n-2}$ | $X_{n-2}$ | $Y_{n-2}$ | 010 | |
| n | $MC_{n-1}$ | $X_{n-1}$ | $Y_{n-1}$ | 010 | |
| n+1 | END | END | END | | | where $Y_3 \leq Y_6 \leq Y_2 \leq Y_5 \leq \ldots \leq Y_{n-2} \leq Y_{n-1}$
(in FIG. 17C, $Y_3 = Y_6 < Y_2 = Y_5 < Y_{14} \ldots Y_{n-2} = Y_{n-1}$)

Figure 22:
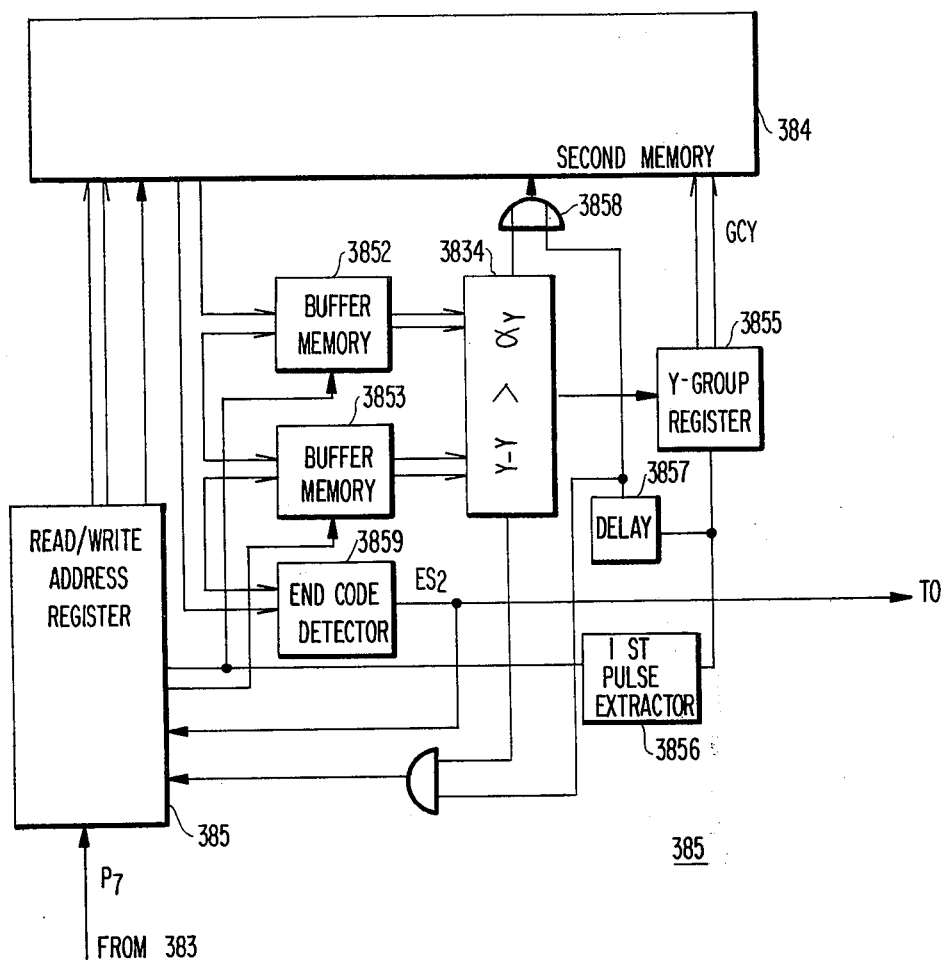
FIG. 22 is a block diagram of a Y-direction grouping circuit which forms a part of FIG. 19.

Referring back to FIG. 19, the pulse $P_7$ from the end code detector 3836 is supplied to the Y-direction grouping circuit 385. The Y-direction grouping circuit 385, identical to the X-direction grouping circuit 382, comprises, as shown in FIG. 22, read address register 3851, buffer registers 3852 and 3852, a comparator 3854, a Y-group coder 3855, a first-pulse extractor 3856, a delay circuit 3857, an OR-circuit 3858, and an end code detector 3859.

In the comparator 3852, the difference between the adjacent signals Y whose values are stored in the buffer memories 3852 and 3853, is compared with a predetermined value $\alpha_Y$. In FIG. 17C, because $Y_{20} - Y_{13} > \alpha_Y$ and the other differences are less than the value $\alpha_Y$, there will be only two Y-group codes $GC_Y$ generated. Therefore, the contents of the second memory 384 will be as follows:

| ADDRESS | MC | X | Y | $GC_X$ | $GC_Y$ |
|---|---|---|---|---|---|
| 0 | $MC_3$ | $X_3$ | $Y_3$ | 001 | 001 |
| 1 | $MC_6$ | $X_6$ | $Y_6$ | 001 | 001 |
| 2 | $MC_2$ | $X_2$ | $Y_2$ | 001 | 001 |
| 3 | $MC_5$ | $X_5$ | $Y_5$ | 001 | 001 |
| 4 | $MC_{14}$ | $X_{14}$ | $Y_{14}$ | 010 | 001 |
| 5 | $MC_8$ | $X_8$ | $Y_8$ | 010 | 001 |
| 6 | $MC_0$ | $X_0$ | $Y_0$ | 001 | 001 |
| 7 | $MC_1$ | $X_1$ | $Y_1$ | 001 | 001 |
| . | . | . | . | . | . |
| 16 | $MC_{18}$ | $X_{18}$ | $Y_{18}$ | 010 | 001 |
| 17 | $MC_{13}$ | $X_{13}$ | $Y_{13}$ | 010 | 001 |
| 18 | $MC_{20}$ | $X_{20}$ | $Y_{20}$ | 010 | 010 |
| 19 | $MC_n$ | $X_n$ | $Y_n$ | 010 | 010 |
| . | . | . | . | . | . |
| n | $MC_{n-1}$ | $X_{n-1}$ | $Y_{n-1}$ | 010 | 010 |
| n+1 | END | END | END | 111 | 111 |

Figure 23:
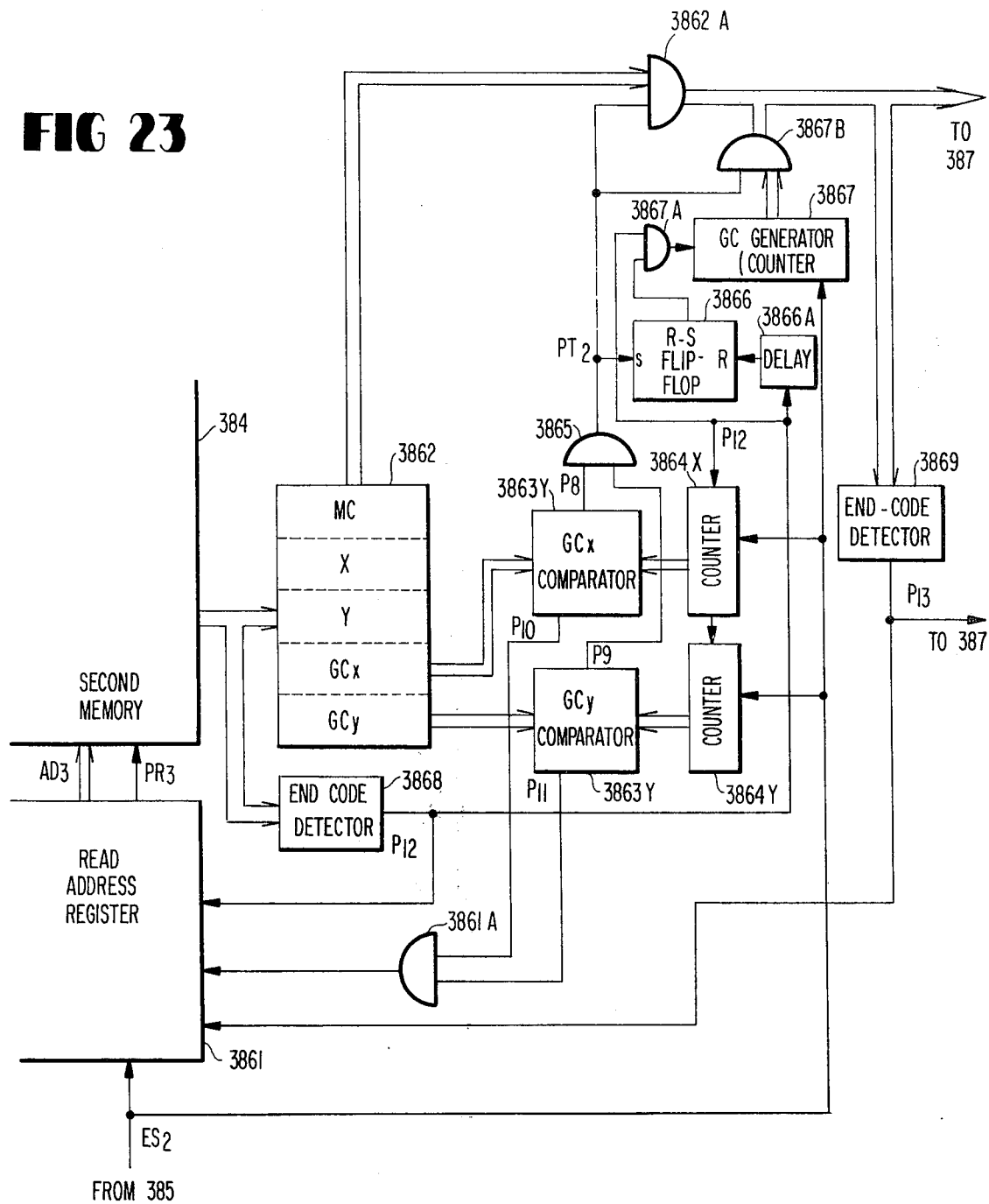
FIG. 23 is a block diagram of a final grouping circuit which forms a part of FIG. 19.

The end signal $ES_2$ representing the completion of the Y-direction grouping is supplied from the end code detector 3859 to the final grouping circuit 386. The final grouping circuit 386 comprises, as shown in FIG. 23, a read address register 3861, a buffer memory 3862, $GC_X$ and $GC_Y$ comparators 3863X and 3863Y, counters 3864X and 3864Y, an AND circuit 3865, an R-S flip-flop 3866, a group code (GC) generator 3867 composed of a 5-stage counter, and end code detectors 3868 and 3869.

The end signal $ES_2$ is supplied to the counters 3864X and 3864Y, and the GC generator 3867, whereby the former are set to 001 and the latter to 00001. The end signal $ES_2$ is also supplied to the read address register 3861 for providing read address data $AD_3$ and a read command pulse $P_{R3}$. The read address data $AD_3$ and a read command pulse $P_{R3}$ are supplied to the second memory 384, whereby the stored data in the second memory 384 are read out. When the read address data $AD_3$ of address 0 and the read command pulse $P_{R3}$ are supplied, the stored data $MC_3$, $X_3$, $Y_3$, $GC_X$ of 001 and $GC_Y$ of 001 at address 0 of the second memory 384 are read out and transferred to the buffer memory 3862 for storage therein. The stored $GC_X$ and $GC_Y$ are supplied to the $GC_X$ and $GC_Y$ comparators 3863X and 3863Y and compared with the contents of the counters 3864X and 3864Y, respectively. The comparators 3863X and 3863Y generate pulses $P_8$ and $P_9$, only when the $GC_X$ and $GC_Y$ are equal to the contents of the counters 3864X and 3864Y, respectively. Because the contents of the counters 3864X and 3864Y are set to 001 in accordance with the end signal $ES_2$, the comparators 3863X and 3863Y generate the pulses $P_8$ and $P_9$ which are supplied to the AND circuit 3865 for providing a transfer pulse $P_{T2}$. The transfer pulse $P_{T2}$ is supplied to AND circuits 3862A and 3867B, whereby the stored data $MC_3$, $X_3$, and $Y_3$ in the buffer memory 3862 and the GC of 00001 from the GC generator 3867 are transferred to the third memory 387 and stored at address 0 thereof. The transfer pulse $P_{T2}$ is also supplied to the set-terminal of the R-S flip-flop 3866, whereby the output of the flip-flop 3866 is maintained at binary 1 until a pulse is supplied to the reset-terminal.

When the comparison and the data transfer are completed, the comparators 3863X and 3863Y generate pulses $P_{10}$ and $P_{11}$, which are supplied through an AND circuit 3861A to the address register 3861, whereby the address data $AD_3$ are converted from address 0 to 1.

In accordance with the address data $AD_3$ of address 1, the data $MC_6$, $X_6$, $GC_X$ of 001, and $GC_Y$ of 001 stored at address 1 are read out and stored in the buffer memory 3862. The stored $GC_X$ and $GC_Y$ are transferred to the comparators 3863X and 3863Y for the comparison with the contents of the counters 3864X and 3864Y. Because the $GC_X$ and $GC_Y$ are 001, the stored data $MC_6$, $X_6$ and $Y_6$ are transferred together with the GC of 00001 stored in the GC generator 3867 to the third memory 387 and stored at address 1 hereof. Similarly the data MC, X, and Y stored at addresses 2 and 3 and GC of 00001 stored in the GC generator 3867 are transferred to the third memory 387 and stored at addresses 2 and 3 thereof, respectively. However, the data stored at addresses 4 and 5 are not transferred because the $GC_X$'s of these data are not 001 but 010 and the comparator 3863X does not generate the pulse $P_8$ while the comparator 3863Y generates the pulse $P_9$.

Further, the data $MC_0$, $X_0$, and $Y_0$ stored at address 6 are transferred with the GC of 00001 to the third memory 387 and stored at address 4 thereof. Similarly, the data stored at addresses 7 to 9 of the second memory 384 are transferred with the GC of 00001 to the third memory 387 and are stored therein at addresses 5 to 7. The data stored at addresses 8 to n of the second memory 384 do not include the $GC_X$ and $GC_Y$ of both 001. Therefore, that data are not transferred to the third memory 387. Thus, when the comparison is completed with respect to the data stored at addresses 0 to n of the second memory 384, the data in which both the $GC_X$ and $GC_Y$ are 001, i.e., the data of the word end block 75 (FIG. 17A) are transferred with the GC of 00001 to the third memory 387 for storage therein at addresses 0 to 7.

When the comparison with respect to the data stored at address n is completed, the pulses $P_{10}$ and $P_{11}$ are generated and the address data $AD_3$ of address n+1 is generated and supplied from the address register 3861 to the second memory 384. In accordance with the address data $AD_3$ of address n+1, the end code is read out and transferred to the buffer memory 3862. The $GC_X$ and $GC_Y$ in the end code are not 001 but is defined, for example, to be 111. Therefore, the end code is not transferred to the third memory 387.

The end code is detected by the end code detector 3868 which generates a pulse $P_{12}$. The pulse $P_{12}$ is supplied to the counter 3864X, whereby the content thereof is converted from 001 to 010. The pulse $P_{12}$ is also supplied to an AND circuit 3867A which is maintained at an open-state by the output (binary 1) of the R-S flip-flop 3866. Therefore, the pulse $P_{12}$ can be supplied to the GC generator 3867, whereby its content is converted from 00001 to 00010. Immediately after the GC content conversion, the pulse $P_{12}$ is supplied through a delay circuit 3866A to the reset-terminal of the R-S flip-flop 3866 to reset the output to binary 0. The ouput of 0 is maintained until at least one pulse is supplied to the jet-terminal.

The pulse $P_{12}$ is further supplied to the address register 3861, whereby the address data $AD_3$ is reset to address 0, and the similar comparing operation of the $GC_X$ and $GC_Y$ with the contents of the counters 3865 and 3866, i.e., 010 and 001, is performed with respect to the data stored at addresses 0 to $n$. As a result, the data in which the GCx is 010 and the $GC_Y$ is 001, i.e., the data of the word end block 76 (FIG. 17A) are transferred together with the GC of 00010 stored in the GC generator 3867 to the third memory and stored at addresses 8 to 17. Further, the output of the R-S flip-flop 3866 are converted to binary 1 and maintained.

After the completion of the data comparison, the pulse $P_{12}$ is obtained, which is supplied to the counter 3864X and the GC generator 3867, whereby they are converted to 011 and 00011, respectively. The pulse $P_{12}$ is also supplied to the address register 3861 to reset the address data $AD_3$ to address 0, whereby the comparison of $GC_X$ and $GC_Y$ of all stored data with 011 and 001 is performed. Similarly, the comparison operation is carried out successively with counter 3864Y remaining at 001 and counter 3864X changing after each set of comparisons, i.e., successively from 100 to 111. However, the $GC_X$'s in the stored data do not correspond to any of the number 011 to 111. Therefore, during the latter comparison sets no data is transferred to the third memory. Because the $GC_X$ and $GC_Y$ number in the end code are defined to be 111, the comparator 3863 generates the pulse $P_8$ when the counter 3865 is set to 111. However, the comparator 3864 does not generate the pulse $P_9$ because the counter 3866 is set to 001. Therefore, the transfer pulse $P_T$ is not obtained.

In the data comparison, because no transfer pulse $P_{12}$ is obtained and supplied to the set-terminal of the R-lS flip-flop 3866, its output is maintained at binary 0. Therefore, the pulse $P_{12}$ can not be supplied to the GC generator 3867, whereby the content of the GC generator is maintained at 00011.

The pulse $P_{12}$ obtained at the end of the comparison set when counter 3864X is 111 recycles the count therein to 001. The counter 3864X, in turn supplies a pulse to the counter 3864Y to advance the number therein from 001 to 010. With the counters 3864X and 3864Y now set at 001 and 010, respectively, the $GC_X$ and $GC_Y$ of the stored data are compared with the counter contents in the same manner described above. However, no data is transferred to the third memory 387 and the GC in the GC generator 3867 is maintained at 00011 because there is no data in the second memory 384 in which the $GC_X$ and $GC_Y$ number are 001 and 010, respectively.

Next, the $GC_X$ and $GC_Y$ number are compared with 010 and 010, respectively, because the counter 3864X will be advanced to 010. As a result, the data of the word end block 77 (FIG. 17A) are transferred and stored together with the GC of 00011 at address 18 to $n$ of the third memory 387 in accordance with the transfer pulses $P_{T2}$. The R-S flip-flop 3866 is converted to binary 1 by the first pulse of the transfer pulses PT2. Therefore, at the end of the data comparison, the number in the GC generator is converted to 00100 by the pulse $P_{12}$. After the GC conversion, the R-S flip-flop 3866 is converted to binary 0 by the pulse from the delay circuit 3866A.

Similarly, the $GC_X$ and $GC_Y$ are compared with the contents of the counters 3864X and 3864Y until both reach 111. When both the counters 3864X and 3864Y are at 111 and the address data $AD_3$ of address $n+1$ is supplied to the second memory 384, the end code is transferred to the third memory 384 and stored at address $n+1$ thereof. The transferred end code is detected by the end code detector 3869 which generates an end signal $ES_3$. The end signal $ES_3$ is supplied to the read address register 3861 to stop providing the address data $AD_3$ and the read command pulse $P_{R3}$.

Thus, the final grouping is completed. The contents of the third memory 384 are as shown in the following table 1 attached hereto.

TABLE 1
CONTENTS OF THE THIRD MEMORY 387

| ADDRESS | MC | X | Y | GC | WORD END BLOCK (FIG. 17A) |
|---|---|---|---|---|---|
| 0 | $MC_3$ | $X_3$ | $Y_3$ | 00001 | |
| 1 | $MC_6$ | $X_6$ | $Y_6$ | | |
| 2 | $MC_2$ | $X_2$ | $Y_2$ | | |
| 3 | $MC_5$ | $X_5$ | $Y_5$ | | |
| 4 | $MC_0$ | $X_0$ | $Y_0$ | | 75 |
| . | . | . | . | | |
| 7 | $MC_7$ | $X_7$ | $Y_7$ | 00001 | |
| 8 | $MC_{14}$ | $X_{14}$ | $Y_{14}$ | 00010 | |
| . | . | . | . | | 76 |
| 17 | $MC_{13}$ | $X_{13}$ | $Y_{13}$ | 00010 | |
| 18 | $MC_{20}$ | $X_{20}$ | $Y_{20}$ | 00011 | |
| . | . | . | . | | 77 |
| n | $M_{n-1}$ | $X_{n-1}$ | $Y_{n-1}$ | 00011 | |
| n+1 | END | END | END | 00100 | |

Figure 24:
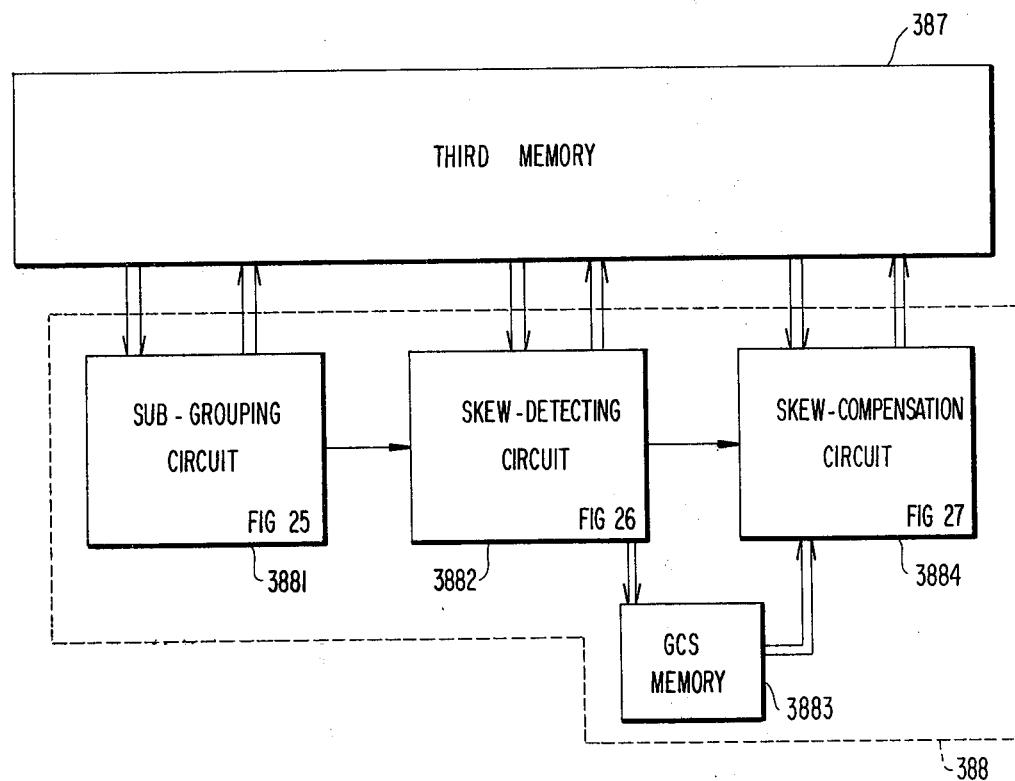
FIG. 24 is a block diagram of skew detector/comparator circuit which forms a part of FIG. 19.

The pulse $P_{13}$ from the end code detector 3869 is supplied to the skew detector/compensator 388. The skew detector/compensator 388 comprises, as shown in FIG. 24, a sub-grouping circuit 3881, a skew detecting circuit 3882, a skewed group code memory 3883, and a skew compensating circuit 3884.

Figure 25:
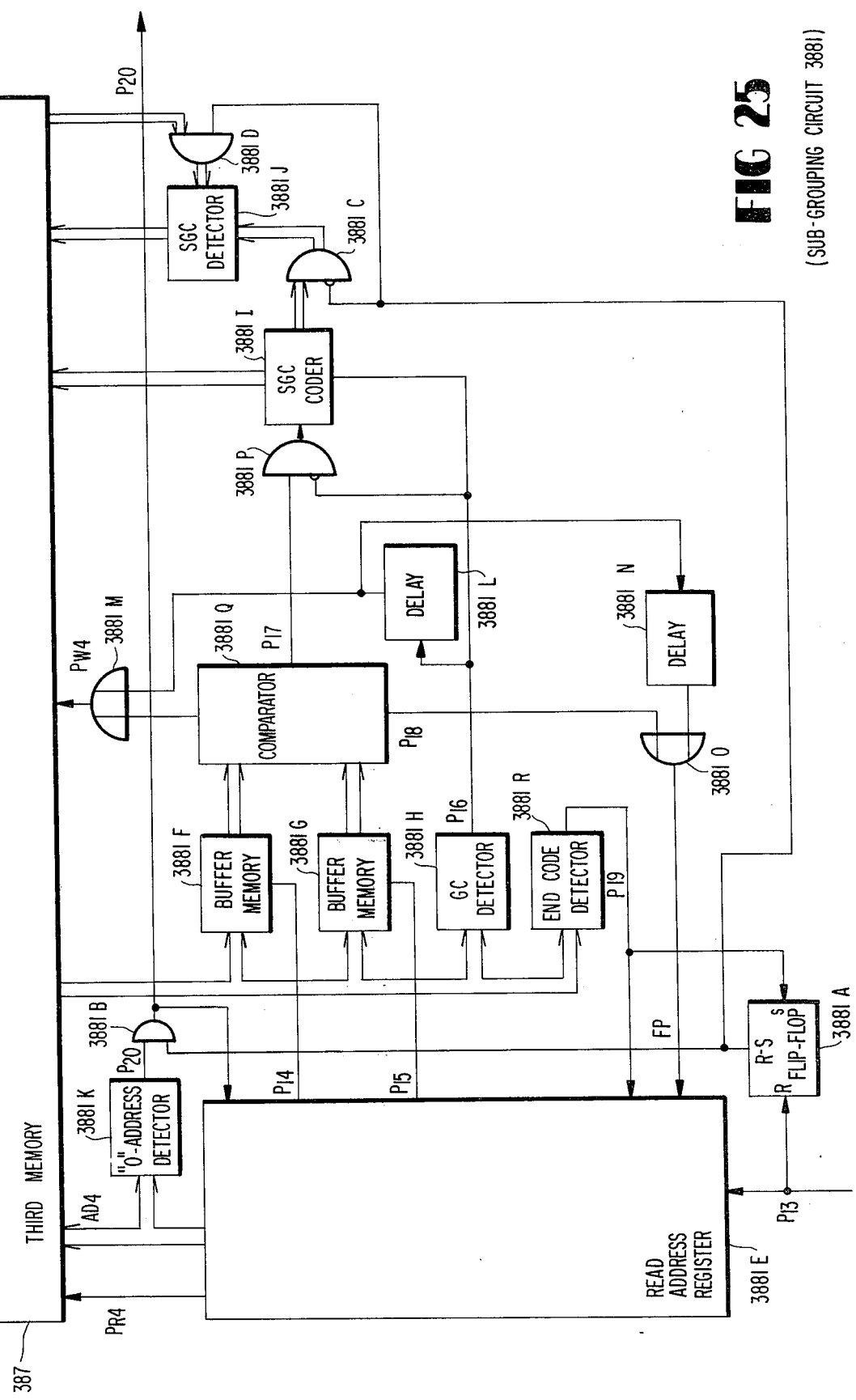
FIG. 25 is a block diagram of sub-grouping circuit which forms a part of FIG. 24.

Referring to FIG. 25, the pulse $P_{13}$ from the end code detector 3869 (FIG. 23) is supplied to a reset-terminal of an R-S flip-flop 3881A to reset it to provide binary 0 at the output terminal thereof. The 0 output closes AND gate 3881B, opens inhibit circuit 3881C, and closes AND circuit 3881D.

The pulse $P_{13}$ is also supplied to a read address register 3881E for providing read address data $AD_4$ of address 0 and a read command pulse PR4. In response to the application of an address $AD_4$ of 0 and a pulse PR4, the data Y3 stored at address 0 of the third memory 387 is read out and stored in a first buffer memory 3881F by a pulse P14. Further, the GC of 00001 stored at address 0 is detected by a GC detector 3881H which generates a pulse P16. The pulse 16 is supplied to an SGC coder 3881I composed of a counter, whereby SGC coder 3881I is set to 0001. Because the GC coder 3881I is connected through the inhibit circuit 3881C in the open state to an SGC detector 3881J, the detector 3881J generates a code $SGC_1$ of 10 representing the change of the subgroup code SGC.

The address data AD4 of address 0 is detected by a 0-address detector 3881K. However, the detected pulse is not passed through the AND-circuit 3881B, because the AND gate 3881B is in the closed state by the output of 0 from the R-S flip-flop.

The pulse P16 from the GC detector 3881H is also supplied to a delay circuit 3881L, and the delayed pulse is supplied through an OR circuit 3881M to the third memory 387 as a write command pulse PW4. In accordance with PW4, the GC of 0001 and the SGC$_1$ of 10 are stored in the respective columns at address 0 of the third memory 387. The delay pulse from the delay circuit 3881L is supplied to another delay circuit 3881N. The delayed pulse from 3881N is supplied through an OR-gate 38810 to the address register 3881E as FP. In accordance with FP, the address data AD4 is set to address 1, and a pulse P15 is generated.

In response to the address AD4 of the value 1 and the pulse P15, the data Y6 and GC of 0001 stored at address 1 of the third memory 387 are read out and supplied to a second buffer memory 3881G and the GC detector 3881H. Because of no change of the group code GC, the GC detector 3881H does not generate the pulse P16. Therefore, an inhibit circuit 3881P remain in the open state.

The data Y3 and Y6 stored in the first and second buffer memories 3881F and 3881G, respectively, are supplied to a comparator 3881Q in which the difference between the data Y6 and Y3 is compared with a predetermined value $\beta$. The comparator 3881Q generates a pulse P17 when the difference is greater than the Value $\beta$. Because Y6 − Y3 < $\beta$ (in FIG. 17A, Y6 = Y3), the pulse P17 is not generated. Therefore, the sub-group code from the SGC coder 3881I remains at 0001. Further, the SGC detector 3881J generates the SGC1 of 01 representative of no change of the SGC. The SGC and SGC1 codes of 0001 and 01 are written into stored the respective columns of the third memory 387 at address 1 in response to write pulse PW4 supplied from the comparator 3881Q through the OR-circuit 3881M.

Then, the comparator 3881Q generates a pulse P18 which is supplied through the OR-gate 38810 to the address register 3881E as the pulse FP. The FP pulse advances the address data AD4 to the address 2 and causes the pulse P14 to be generated. In response to the address AD4 of 2 and the pulse P14, the data Y2 and GC of 0001 are read out and supplied to the first buffer memory 3881F and the GC detector 3881H, respectively. The data Y2 is supplied to the comparator 3881Q in which the difference between the data Y2 and Y6 is compared with the value $\beta$. Because Y2 − Y6 > $\beta$, the comparator 3881Q generates the pulse P17, which is supplied through the inhibit circuit 3881P in the open state to the SGC coder 3881I. Therefore, the SGC of the SGC coder 3881I is advanced to a count of 0010 and the SGC dtector 3881J detects the change in the SGC number and thereby generates 10. The SGC and SGC1 codes of 0010 and 10 are written into the third memory 387 at address 2.

Similarly, the same SGC and SGC1 codes are stored at address 3. Further, at address 4, the SGC code of 0011 and the SGC1 code of 10 are stored, and at addresses 5 to 7, the SGC code of 0011 and the SGC1 code of 01 are stored.

After writing the latter codes into the memory at address 7, the comparator 3881Q generates and supplies the pulse P18 through the OR-circuit 38810 to the address register 3881E as the pulse FP. The AD4 of address 8 and the pulse P14 are generated in accordance with FP. Therefore, the data Y14 and GC of 00010 stored at address 8 are read out and supplied to the buffer memory 3881F and the GC detector 3881H, respectively. Because the GC value associated with Y14 is 00010, the GC detector 3881H detects a change from the prior GC and generates the pulse P16. Therefore, the SGC of the SGC detector 3881I is reset to 0001 and the inhibit circuit 3881P is closed. Because of the SGC conversion from 0011 to 0001, the SGC1 of the SGC detector 3881J is set to 10. The SGC code of 0001 and the SGC1 code of 10 are stored at address 8. In the same manner, the SGC and SGC1 codes are stored with respect to address 0 to $n+1$.

In reading and storing at address $n+1$, the end code is detected by the end code detector 3881R which generates a pulse P19. The pulse P19 is supplied to the R-S flip-flop 3881A, whereby the output thereof is converted to binary 1. The binary 1 output opens the AND gates 3881B and 38810 closes the inhibit circuit 3881C.

Beginning with the generation of the first P19 pulse, the subgrouping circuit of FIG. 25 operates to read out successively the SGC codes stored at the addresses $n$, $n-1$, $n\,2$, ... 3, 2, 1, and 0, and at the same time to generate an additional code, designated SGC2, which is 10 for a change in the SGC code and 01 for no change. The P19 pulse changes the address AD4 from $n-1$ to $n$. In other words, in accordance with the pulse P19, the data AD4 of $n$ and one of the pulses P14 and P15 are generated. The data AD4 of address $n$ is supplied to the third memory 387. The data Yn-1 and SGC of 0011 stored at address $n$ are then read out. The SGC number is supplied through the AND gate 3881D to the SGC detector 3881J which generates a code SGC2 of 10 and 01 when the SGC is changed and not changed, respectively. Therefore, the SGC of 10 is generated and stored in the SGC2 column at address $n$. Similarly, the codes SGC2 are stored at addresses $n-1$ to 0.

When the address AD4 reaches 0, it is detected by the 0-address detector 3881K which generates a pulse P20. The pulse P20 is supplied to the address register 3881E, whereby it is reset to an initial state.

Thus, the sub grouping is completed and the codes SGC, SGC1 SGC2 are stored at the respective addresses, as shown in TABLE 2.

TABLE 2

| ADDRESS | MC | X | Y | GC | SGC | SGC$_1$ | SGC$_2$ |
|---|---|---|---|---|---|---|---|
| 0 | MC$_3$ | X$_3$ | Y$_3$ | 00001 | 0001 | 10 | 01 |
| 1 | | | Y$_6$ | | 0001 | 01 | 10 |
| 2 | | | Y$_2$ | | 0010 | 10 | 01 |
| 3 | | | Y$_5$ | | 0010 | 01 | 10 |
| 4 | | | Y$_0$ | | 0011 | 10 | 01 |
| 5 | | | Y$_1$ | | 0011 | 01 | 01 |
| 6 | | | Y$_4$ | | 0011 | 01 | 01 |
| 7 | | | Y$_7$ | 00001 | 0011 | 01 | 10 |
| 8 | | | Y$_{14}$ | 00010 | 0001 | 10 | 01 |
| 9 | | | Y$_8$ | | 0001 | 01 | 10 |
| 10 | | | Y$_{22}$ | | 0010 | 10 | 01 |
| 11 | | | Y$_{11}$ | | 0010 | 01 | 01 |
| 12 | | | Y$_{12}$ | | 0010 | 01 | 10 |
| 13 | | | Y$_{16}$ | | 0011 | 10 | 10 |
| 14 | | | Y$_{10}$ | | 0100 | 10 | 10 |
| 15 | | | Y$_9$ | | 0101 | 10 | 01 |
| 16 | | | Y$_{18}$ | | 0101 | 01 | 10 |
| 17 | | | Y$_{13}$ | 00010 | 0110 | 10 | 10 |
| 18 | | | Y$_{20}$ | 00011 | 0001 | 10 | 01 |
| 19 | | | Y$_n$ | | 0001 | 01 | 10 |
| 20 | | | Y$_{17}$ | | 0010 | 10 | 01 |
| ⋮ | | | | | | | |
| | | | Y$_{15}$ | | 0011 | 10 | 01 |
| | | | Y$_{19}$ | | 0011 | 01 | 01 |
| $n-1$ | | | Y$_{21}$ | | 0011 | 01 | 01 |
| $n$ | MC$_{n-1}$ | X$_{n-1}$ | Y$_{n-1}$ | | 0011 | 01 | 10 |
| $n+1$ | END | END | END | 00100 | 0001 | 10 | / |

Figure 26:
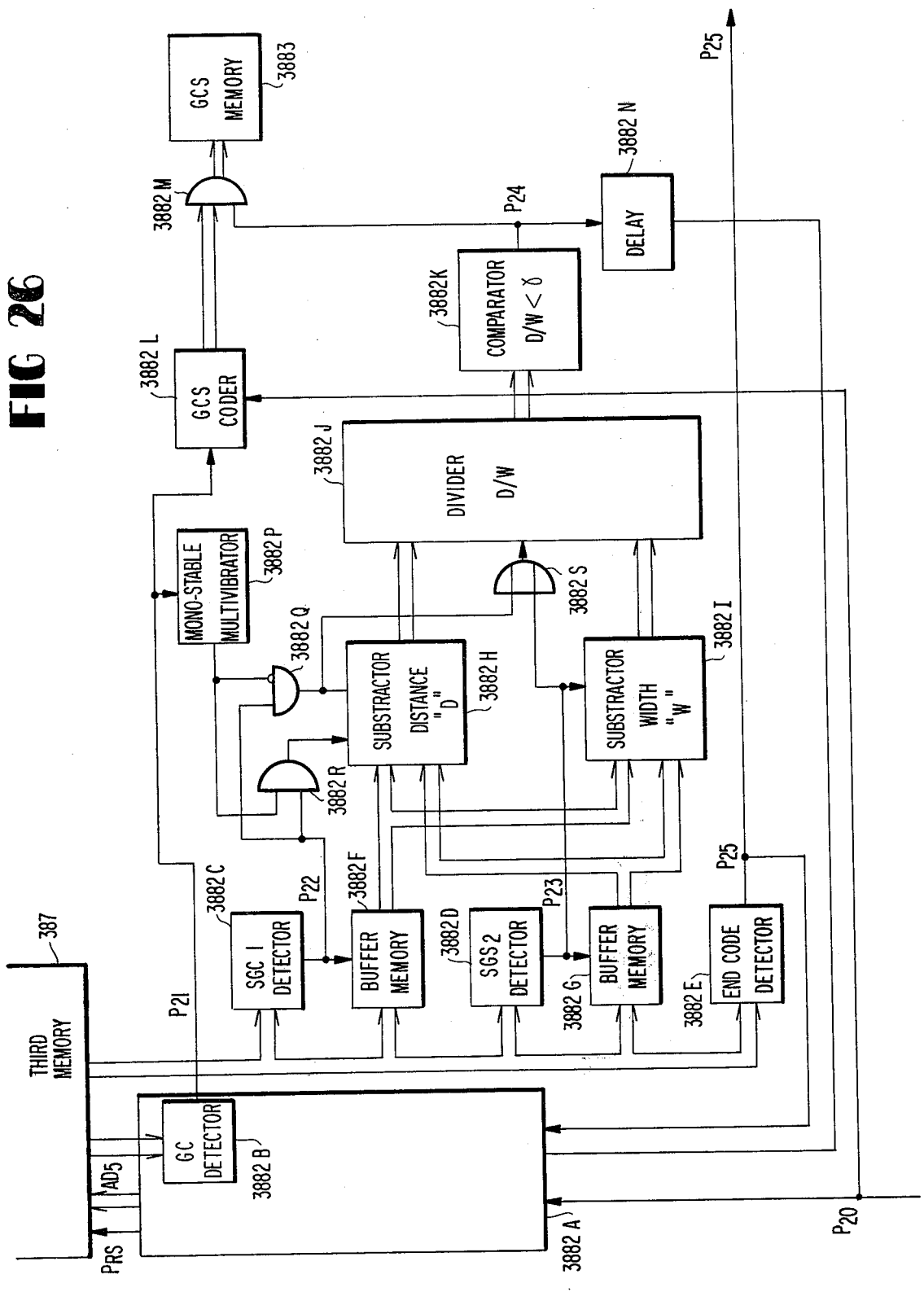
FIG. 26 is a block diagram of a skew detector circuit which forms a part of FIG. 24.

The pulse P20 from the sub-grouping circuit 3881 is supplied to the skew detector 3882 shown in FIG. 26. The skew detector 3882 comprises a read address register 3882A, detectors 3882B, 3882C, 3882D, and 3882E, buffer memories 3882F and 3882G, subtractors 3882H and 3882I, a divider 3882J, a comparator 3882K, a skewed group coder 3882L, and AND gate 3882M, and a delay circuit 3882N.

The pulse P20 is supplied to the skewed coder 3882L to set it to 00000. The pulse P20 is also supplied to the read address register 3882A, thereby to provide in sequence the address data $AD_5$ of addresses 0 to $n+1$. First, the address AD5 of 0 and a read command pulse PR5 are supplied to the third memory 387. The GC of 00001 stored at address 0 is supplied to the GC detector 3882B which generates a pulse P21 when the GC is changed. The pulse P21 is supplied to the skewed group coder 3882L to advance it to the count of 0001. The pulse P21 is also supplied through a mono-stable multivibrator 3882P to an inhibit circuit 3882Q and an AND gate 3882R for inhibiting and passing a pulse P22 from the SGC1 detector 3882C, respectively. The detector 3882C detects the SGC1 of 10 and generates the pulse P22. The pulse P22 is supplied through the AND circuit 3882R to a reset terminal of the subtractor 3882H which produces the distance D of the subgroups, whereby D of the subtractor 3882H is set to the maximum value Dm.

The pulse P22 from the SGC1 detector 3882C is supplied to the buffer memory 3882F, whereby the data Y3 stored at address 0 is stored in the buffer memory 3882F.

Then, the address data $AD_5$ of address 1 is supplied to the third memory 387. The SGC2 detects the SGC2 of 10 and generates a pulse P23 which is supplied to the buffer memory 3882G in which the data Y6 stored at address 1 is stored. The data Y3 and Y6 stored in the buffer memories 3882F and 3882G are supplied to the subtractor 3882I in which the subgroup width W, i.e., $W1 = Y6 - Y3$ is obtained in accordance with the pulse P23. The width W1 is supplied to the divider 3882J which is supplied with the subgroup distance D from the buffer memory 3882H. In the divider 3882J, the ratio D/W is obtained in accordance with the pulse P23 supplied through an OR circuit 3882S. The ratio D/W is supplied to the comparator 3882K and compared with a predetermined value $\gamma$. The comparator 3882K generates a pulse P24 when the ratio D/W is less than the value $\gamma$, i.e., $D/W < \gamma$. Because the distance D is set to the maximum value Dm, the pulse P24 is not generated.

In accordance with the address data AD5 of address 2, the data Y2 stored at address 2 of the third memory 387 is stored in the buffer 3882F. The data Y2 is supplied to the subtractor 3882H, in which the distance $D1 = Y2 - Y6$ is obtained in accordance with the pulse P22 from the SGC1 detector 3882C through the inhibit circuit 3882Q. The distance D1 is supplied to the divider 3882J to obtain the ratio D1/W1 which is supplied to the comparator 3882K. Because $D1/W1 > \gamma$, the comparator 3882K does not generate the pulse P24. Similarly, the ratios D/W (D1/W1, D2/W2, . . . ) are compared with the value $\gamma$. However, in the first group having the group code GC of 00001, all the ratio D/W are greater than the value $\gamma$. Therefore, the pulse P24 is not generated.

When the address data AD5 of address 8 is supplied to the third memory 387, the GC of 00010 is detected by the GC detector 3882B which generates the pulse P21. The pulse P21 is supplied to the skewed group coder 3882L to convert its contents to 00010. The pulse P21 is also supplied through the monostable multivibrator 3882P to the inhibit circuit 3882Q and the AND gate 3882R. Further, the SGC1 detector generates the pulse P22, which is supplied through the AND circuit 3882R to the subtractor 3882H to set the distance D to Dm. At the same time, the data Y14 is stored in the buffer memory 3882F by the pulse P22. Similarly, the ratio D/W is compared with the value.

When the AD5 of 13 is supplied to the third memory 387, the data Y16 is supplied to the buffer memories 3882F and 3882G because the SGC1 and SGC2 detectors 3882C and 3882D generate the pulse P22 and P23. Therefore, the comparator 3882K generated the pulse P24, which is supplied to an AND gate 3882M which is supplied with the skewed group code GCS from the skewed group coder 3882L. Thus, the code GCS representing the skewed group is stored in the GCS memory 3883.

The pulse P24 is supplied through the delay circuit 3882N to the read address register 3882A, to cause the address code AD5 to jump to address 18 at which the detector 3882B generates the pulse P21. After that, the same operation as previously described is performed for skew-detecting. In FIG. 17, only the group 76 having the group code GC of 00010 is skewed. Therefore, only the GCS of 00010 is stored in the GCS memory 3883.

When the address data AD5 of address $n+1$ is supplied to the third memory 387, the end code detector 3882E generates a pulse P25 which is supplied to the read address register 3882A, to reset it to the initial state.

Figure 27:
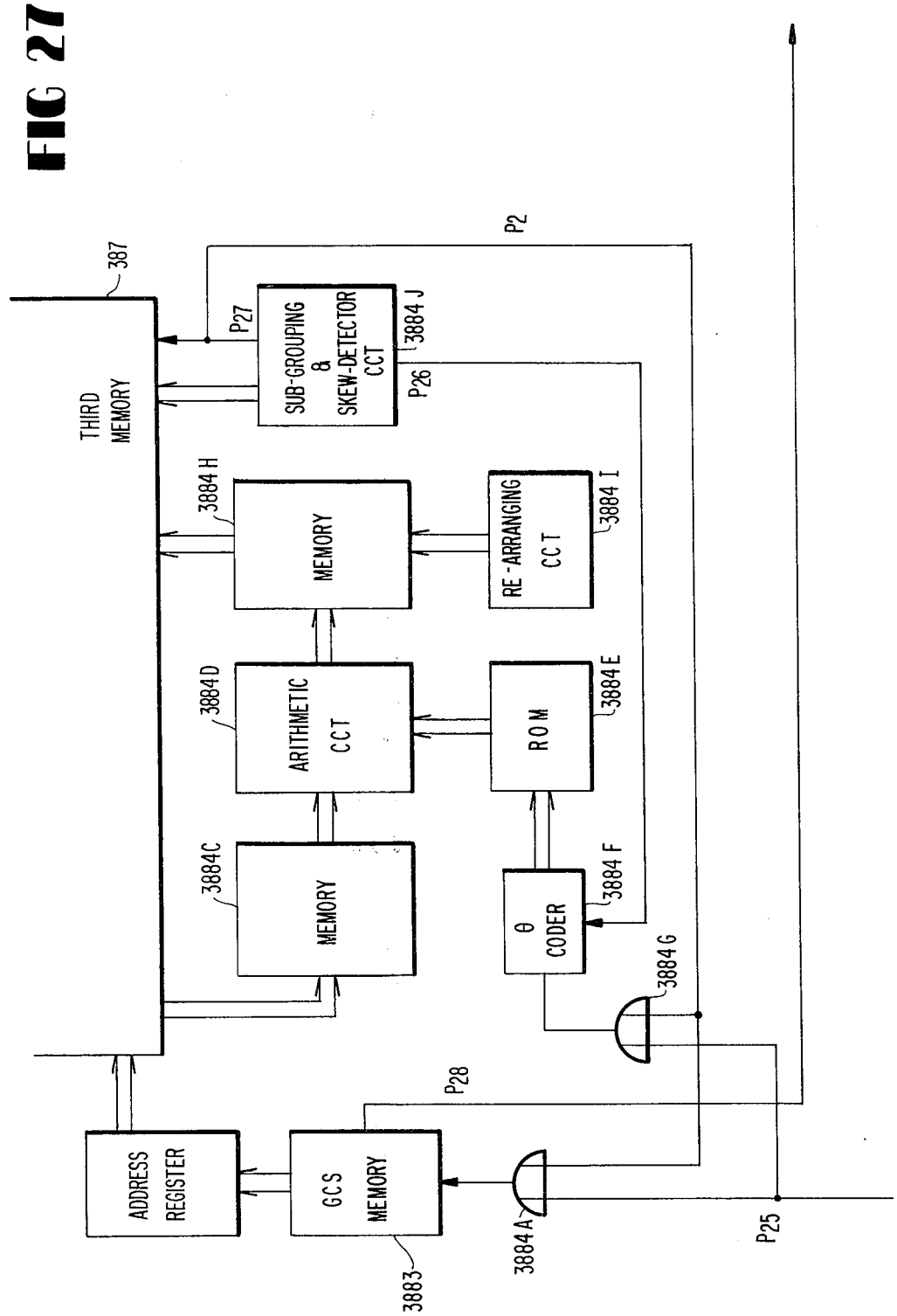
FIG. 27 is a block diagram of a skew compensating circuit which forms a part of FIG. 24.

The pulse P25 is supplied to the skew compensator 3884 shown in FIG. 27. Referring to FIG. 27, the pulse P25 is supplied through an OR circuit 3884A to the GCS memory 3883, whereby the first GCS of 00010 stored in the memory 3883 is supplied to an address register 3884B. The address register 3884B supplies the address data AD6 (addresses 8 to 17) at which the data of the skewed group designated by the first GCS are stored. In accordance with the AD6 (8 to 17), the data MC (MC14, MC8 . . . MC13), X X14, , X8, . . . X13) ) and Y Y14, Y8, . . . Y13) stored at addresses 8 to 7 of the third memory 387 are read out and supplied to a buffer memory 3884C for storage therein. The data MC, X and Y are supplied to an arithmetic circuit 3884D which is supplied with values of sin $\theta$ and cos $\theta$ from a read-only-memory (ROM) 3884E. The ROM 3884E is supplied with a skew angle $\theta$ in turn in the order of $+1°, -1°, +2°, -2°, +3°, \ldots$ from skew angle coder 3884F.

The pulse P25 is supplied through an OR circuit 3884G to the coder 3884F to permit the angle code $\theta$ of $+1°$ to be supplied to the ROM 3884E. The ROM 3884E supplies sin 1° and cos 1° to the arithmetic circuit 3884D in which the following calculations are performed to obtain the data X'(+1), Y'(+1);

$$X'(+1) = X \cos 1° + Y \sin 1°$$

$$Y'(+1) = Y \cos 1° - X \sin 1°$$

The obtained data X'(+1) and Y'(+1) are stored in a buffer memory 3884H. The data MC, X'(+1) and Y'(+1) are supplied to a rearranging circuit 3884I identical to the rearranging circuit 383 shown in FIG. 21 for rearranging the data in the order of Y. The rearranged data Y'(+1) are supplied to a subgrouping/- skewdetecting circuit 3884J. The subgrouping/skew-detecting circuit 3884J may be identical to the subgrouping circuit 3881 and the skew detecting circuit 3882 shown in FIGS. 25 and 26.

The circuit 3884J generates a pulse P26 when the skew is detected by using the compensated data Y'. The pulse P26 is supplied to the coder 3884F to provide the angle data $\theta$ of $-1°$. The angle data $\theta$ of $-1°$ is supplied to the ROM 3884E to provide sin $(-1°)$ and cos $(-1°)$ which are supplied to the arithmetic circuit 3884I. The arithmetic circuit 3884I performs the following calculation:

$$X'(-1) = X \cos(-1°) + Y \sin(-1°)$$

$$Y'(-1) = Y \cos(-1°) - Y \sin(-1°)$$

The data MC, $X'(-1)$ and $Y'(-1)$ are stored in the memory 3884H and the data $Y'(-1)$ supplied to the skew detecting circuit 3884I for skew detecting by using the data $Y'(-1)$. The skew detection is repeated by changing the skew angle data $\theta$ until the skew detecting circuit 3884J generates a pulse P27 representing the no-skew.

When the pulse P27 is generated, the compensated and rearranged data MC, X' and Y' stored in the buffer memory 3884H and the subgroup code SGC' stored in the buffer memory of the circuit 3884J are supplied to the third memory 387 and stored in the respective columns at addresses 8 to 17 thereof.

The pulse P27 is also supplied through the OR circuits 3884A and 3884G to the GCS memory 3883 and the coder 3884F, respectively. Therefore, the angle data $\theta$ of the coder 3884F is reset to the initial condition, i.e., to $+1°$, and the second GCS stored in the GCS memory 3883 is supplied to the address register 3884B.

If the second GCS is not stored in the GCS memory 3883, a pulse P28 is generated by the GCS memory 3883. Thus, the skew compensating is completed. As a result, the contents of the third memory 387 are as follows:

TABLE 3

| ADDRESS | MC | X | Y | GC | SGC | SGC$_1$ | SGC$_2$ |
|---------|-----|-----|-----|-------|------|-----|-----|
| 0 | MC$_3$ | X$_3$ | Y$_3$ | 00001 | 0001 | 10 | 01 |
| 1 | | | Y$_6$ | | | | |
| 2 | | | Y$_2$ | | | | |
| . | | | | | | | |
| . | | | | | | | |
| . | | | | | | | |
| 7 | | | Y$_7$ | 00001 | 0011 | 01 | 10 |
| 8 | MC$_{14}$ | X'$_{14}$ | Y'$_{14}$ | 00010 | 0001 | 10 | 10 |
| 9 | MC$_{22}$ | X'$_{22}$ | Y'$_{22}$ | | 0001 | 01 | 10 |
| 10 | MC$_8$ | X'$_8$ | Y'$_8$ | | 0010 | 10 | 01 |
| 11 | MC$_{11}$ | X'$_{11}$ | Y'$_{11}$ | | 0010 | 01 | 01 |
| 12 | MC$_{12}$ | X'$_{12}$ | Y'$_{12}$ | | 0010 | 01 | 01 |
| 13 | MC$_{16}$ | X'$_{16}$ | Y'$_{16}$ | | 0010 | 01 | 10 |
| 14 | MC$_{10}$ | X'$_{10}$ | Y'$_{10}$ | | 0011 | 10 | 01 |
| 15 | MC$_{18}$ | X'$_{18}$ | Y'$_{18}$ | | 0011 | 01 | 10 |
| 16 | MC$_9$ | X'$_9$ | Y'$_9$ | | 0100 | 10 | 01 |
| 17 | MC$_{13}$ | X'$_{13}$ | Y'$_{13}$ | 00010 | 0100 | 01 | 10 |
| 18 | MC$_{20}$ | X$_{20}$ | Y$_{20}$ | 00011 | 0001 | 10 | 01 |
| . | | | | | | | |
| . | | | | | | | |
| . | | | | | | | |
| n | MC$_{n-1}$ | X$_{n-1}$ | Y$_{n-1}$ | | | | |
| n+1 | END | END | END | 00100 | 0001 | 10 | / |

Figure 28:
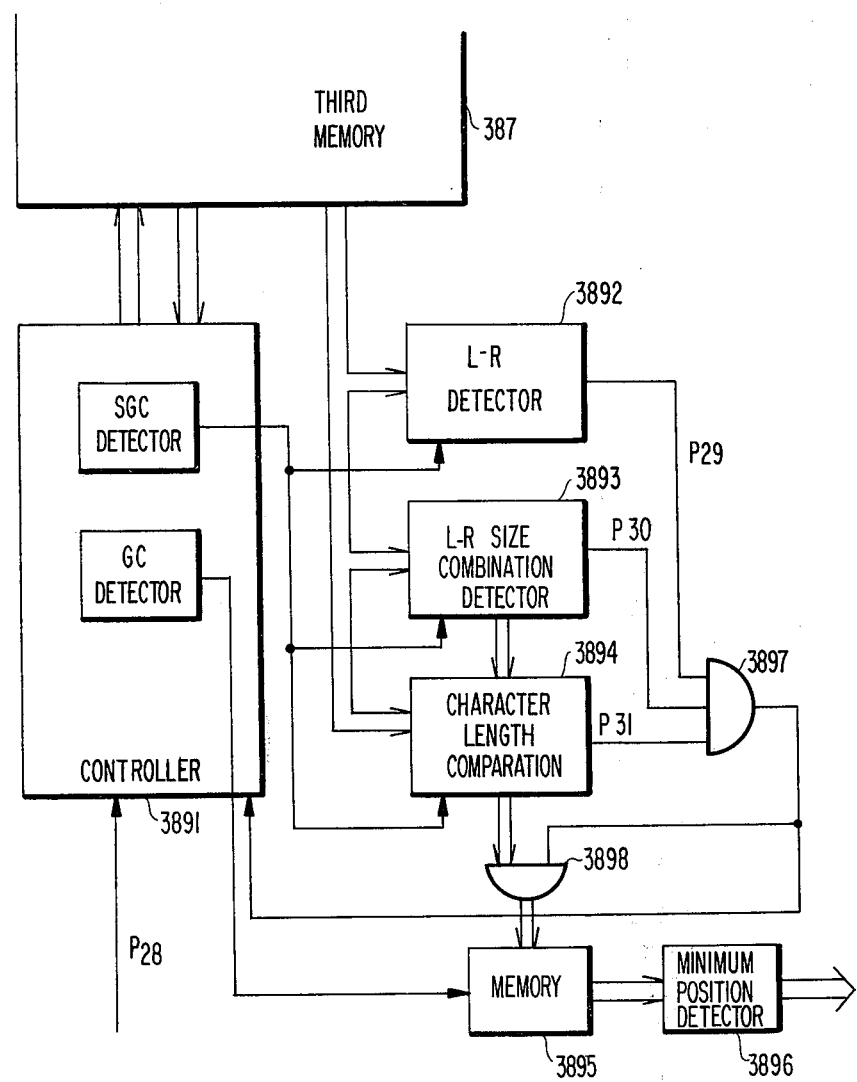
FIG. 28 is a block diagram of a postal code detector circuit which forms a part of FIG. 19.

The pulse P28 is supplied to the postal code detector 389 shown in FIG. 28. The postal code detector 389 comprises a controller 3891, an L-R detector 3892, and L-R combination detector 3893, a character length comparator 3894, a buffer memory 3895, and a minimum position data detector 3896. In order to understand the operation of the postal code detector 389, reference is again made to the four conditions for postal code detection. They are:

1. The word ends are arranged in the order of the rear end, the front end, the rear end, ..., i.e., R, L, R, L, ..., in each word end line.
2. The word size combination of the rear and front ends does not include the combinations of S-L (small-large), S-E (small-extra large), and M-E (medium-extra large).
3. The word length XL −XR is 3-character length satisfying $\delta1 < XL - XR < \delta2$.

The values $\delta1$ and $\delta2$ depend on the word size combination and are as follows:

| WORD SIZE COMBINATION | $\delta1$ mm | $\delta1$ NUMBER OF BITS | $\delta2$ mm | $\delta2$ NUMBER OF BITS |
|---|---|---|---|---|
| S-S | 5.31 | 17 | 7.19 | 23 |
| S-M | 6.25 | 20 | 8.44 | 27 |
| M-M | 7.19 | 23 | 10.00 | 32 |
| M-L | 8.44 | 27 | 10.94 | 35 |
| L-L | 10.00 | 32 | 12.50 | 40 |
| L-E | 10.94 | 35 | 13.44 | 43 |
| E-E | 12.50 | 40 | 14.69 | 47 |

4. The postal code is put above or in line with the uppermost line of the address.

When the pulse P28 is supplied to the controller 3891, the data MC, X, Y, GC and SGC are read out from the third memory 387. The data MC is supplied to the detectors 3892 and 3893. In the detector 3892, the third bits MC-3, which indicate whether the MC is leading end or a rear end, are compared with each other for detecting the arranging order of the word ends. When a predetermined arranging order i.e., a rear end followed by a leading end, (R → L) is detected, a pulse P29 is generated (Refer to the condition (1) of the postal code condition mentioned previously). In the detector 3893, the size combination is detected by using the first and second bits MC-1 and MC-2 of the mask code. When one of seven useful combinations (i.e., S—S, S—M, M—M, etc.) is detected, the pulse P30 is generated and its combination code is supplied to the comparator 3894. The comparator 3894 is supplied with the data X and Y. In the comparator 3894, the character length is calculated by the data X of the word combination and is compared with predetermined values $\delta_1$ and $\delta_2$ which depend upon the kind of combination. When the character length is within the area between the values $\delta_1$ and $\delta_2$, the pulse P31 generated. The pulses P29, P30 and P31 are supplied to an AND gate 3897 whose output is connected to an AND circuit 3898. Therefore, when all the pulses P29, P30 and P31 are obtained, i.e., the conditions (1), (2) and (3) of the previously described postal code detection conditions are satisfied, and the data X and Y are transferred to the memory 3895.

The output of the AND gate 3897 is also supplied to the controller 3891 to stop the detection in its group, and to start the detection for the following group. Thus, the combination data X and Y satisfying the conditions (1), (2) and (3) are stored in the memory 3895. The data therein are supplied to the detector 3896 in which the data Y are compared with each other to select the data combination X and Y having a minimum value of Y as the postal code.

The data X and Y representative of the postal code are transferred to the scanner 42 of the main scanner 40. The scanner 42 may be composed of the image dissector tube 14 shown in FIG. 4 of the U.S. Pat. No. 3,846,753. The scanner 42 provides video bits to a recognition circuit 50 which may be as shown in U.S. Pat. No. 3,878,509. If the transferred data to the scanner 42 has been compensated in the skew compensator 388, the skew angle θ may be transferred to the scanner 42 for finer scanning.

Figure 29:
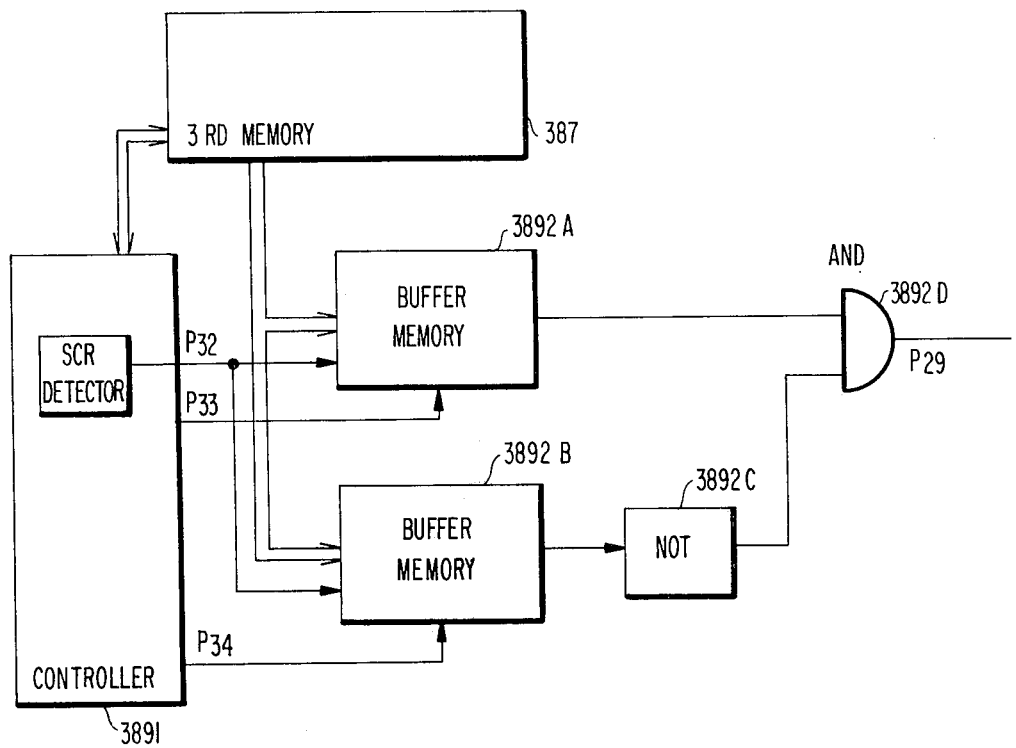
FIG. 29 is a block diagram of an L-R detector circuit which forms a part of FIG. 28.

An example of the L-R detector 3892 is illustrated in FIG. 29 and comprises buffer memories 3892A and 3892B, AND gate 3892D, and NOT circuit 3892C. Every time the SGC is changed, the pulse P32 is generated in the SGC detector. The pulse P32 is used for resetting the buffer memories 3892A and 3892B. Pulses P33 and P34 are alternately generated to supply the data from the third memory 387 alternately to the buffer memories 3892A and 3892B. The third-order bits MC 3 representing the kind of word end (leading or rear) are stored alternately in the memories 3892A and 3892B. The output of the memory 3892B is connected through the NOT circuit 3892C to the AND gate 3892D.

Thus, within the subgroup, the MC-3 code bit of the first and second, third and fourth, etc. data combination from the memory are stored in the buffer memories 3892A and 3892B, respectively. Consequently, if the consecutive data represents rear end followed by leading end, there will be a binary 1 output from AND gate 3892D.

Figure 30:
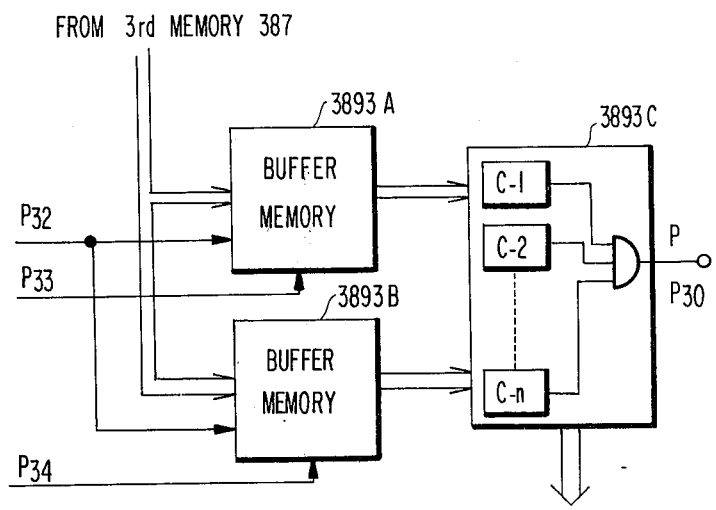
FIG. 30 is a block diagram of an L-R size combination detector which forms a part of FIG. 28.

The L-R size combination circuit 3893 is illustrated in FIG. 30.

The first- and second-order bits MC-1 and MC-2 are stored in the buffer memories 3893A and 3893B. The MC-1R and MC-2R stored in the buffer memory 3893A and MC-1L and MC-2L stored in the buffer memory 3893B are supplied to the detector 3893C to identify the kind of L-R size combination.

The detector 3893C comprises seven detectors C-1, C-2, C-3 . . . C-7, which are shown in FIGS. 31A and 31B. The logic for each detector is simple and the drawings are self explanatory. The existence of an output of any one of the C-detectors indicates one of the permissible size combinations has been detected.

While the position determination circuit 38 (FIG. 3) has been described in terms of logic circuitry and the function thereof, it will be apparent that the same logic operations can be implemented in a general purpose digital computer, if programmed in accordance with the detailed logic operations explained herein.

What is claimed is:

1. In a mail sorting system of the type which automatically sorts mail based upon a machine recognizable postal code positioned on mail items within a specified field of characters grouped in words, the improvement comprising a pre-scanning means for detecting the word end positions of words in said field and distinguishing which of said word end positions constitute the positions of said postal code, said pre-scanning means comprising
   a. optical scanner means for scanning said field and developing video bits corresponding to presence of characters instantaneously scanned,
   b. shift register means, receiving said video bits, for storing said video bits temporarily in the order received,
   c. word end masking means, responsive to the condition of video bits in selected stages of said shift register means, for generating a word end signal when the said condition of video bits satisfies preset criteria indicative of a word end being scanned,
   d. height masking means, responsive to the condition of video bits in several selected combinations of stages of said shift register means, for generating height detection signals indicative of the height of a character scanned and stored in said shift register means.
   e. mask signal generating means responsive to said word end signal and said height detection signals for providing a mask signal indicative of the detection of the front or rear end of a word and the height of the character at the detected end of said word,
   f. scan position determining means for continuously developing signals representing the coordinate position of said scan within said field, said scan position determining means being responsive to said mask signal for outputting the coordinate position signals of said detected word end, and
   g. position determining means, connected to receive all mask signals and coordinate position signals developed during the scan of a field, for selecting the coordinate position signals satisfying a set of predetermined conditions as the coordinate position signals of said postal code.

2. A mail sorting system as claimed in claim 1 wherein said word end masking means comprises a group of front end mask detectors and a group of rear end mask detectors, each said front end mask detector logically combining outputs from stages of said shift register means to provide a front end output signal when the video bits in said shift register means indicate the detection of the edge of a character plus no character indicating bits resulting from a predetermined amount of space in front of said edge, each said rear end mask detector logically combining outputs from stages of said shift register means to provide a front end output signal when the video bits in said shift register means indicate the detection of the edge of a character plus no character indicating bits resulting from a predetermined amount of space rearwardly of said edge.

3. A mail sorting system as claimed in claim 2 wherein said scan position determining means comprises means for developing uncorrected coordinate position signals representative of the instantaneous scan position within said field and compensating means for altering said uncorrected coordinate position signals in accordance with the difference between the instantaneous scan position when a mask signal is obtained and the scan position occurring when the bits causing said mask signal were first entered into said shift register means.

4. A mail sorting system as claimed in claim 1 wherein said position determining means comprises, storage means for storing said mask signals and said coordinate position signals, and computational means for rearranging the data in storage in groups and subgroups within said groups dependent upon the distance between coordinate position of adjacent coordinate position signals.

5. A mail sorting system as claimed in claim 1 wherein said optical scanner means scans said field in a raster pattern, with a plurality of Y direction scans separated from each other in the X direction, said Y and X directions being coordinate directions, and wherein said coordinate position signals are X and Y data signals.

6. A mail sorting system as claimed in claim 5 wherein said mask signals generated by said mask signal generating means are binary coded signals indicating (a) existence of a masking signal (b) front or rear end detected, and (c) height of the character at the end detected.

7. A mail sorting system as claimed in claim 6 wherein said position determining means comprises,
   a. memory means for receiving and storing said mask and X and Y data signals as they occur,
   b. first means for rearranging said latter stored signals into X groups and assigning and storing an X group code $GC_X$ along with each group, all said latter stored signals written a predetermined maximum X distance of one another being grouped in the same X-group.

* * * * *

UNITED STATES PATENT AND TRADEMARK OFFICE
CERTIFICATE OF CORRECTION

PATENT NO. : 4,034,341
DATED : July 5, 1977
INVENTOR(S) : Tomoyuki ISONO et al

It is certified that error appears in the above-identified patent and that said Letters Patent are hereby corrected as shown below:

Column 3, line 53 "compound" should be --composed--;

Column 7, line 63, delete "1" and insert --("1");

Column 14, line 32, delete "cuicuit" and insert --circuit--;

Column 14, line 65, delete "3852" (second occurrence) and substitute --3853--;

Column 16, line 68, delete "jet-terminal" and insert set-terminal--;

Column 17, line 34, delete "R-IS" and insert --R-S--;

Column 18, line 55, delete "GC" and insert --SGC--;

UNITED STATES PATENT AND TRADEMARK OFFICE
CERTIFICATE OF CORRECTION

PATENT NO. : 4,034,341
DATED : July 5, 1977
INVENTOR(S) : Tomoyuki ISONO et al

It is certified that error appears in the above—identified patent and that said Letters Patent are hereby corrected as shown below:

Column 18, line 67, "tothe" should be --to the--;

Column 20, line 12, delete "38810" and insert --3881D--;

Column 20, line 30, delete "n-1" and insert --n+1--;

Column 21, line 30, after "$SGC_2$" insert --detector 3882D--;

Column 21, line 50, after "buffer" insert --memory--;

Column 22, line 43, delete second parenthesis after "X13";

Column 22, line 43, insert parenthesis between Y and Y14.

Signed and Sealed this

Twenty-second Day of November 1977

[SEAL]

Attest:

RUTH C. MASON
Attesting Officer

LUTRELLE F. PARKER
Acting Commissioner of Patents and Trademarks